United States Patent
Cho et al.

(10) Patent No.: US 9,891,756 B2
(45) Date of Patent: Feb. 13, 2018

(54) VEHICLE DISPLAY APPARATUS INCLUDING CAPACITIVE AND LIGHT-BASED INPUT SENSORS

(71) Applicant: LG ELECTRONICS INC., Seoul (KR)

(72) Inventors: Youngjun Cho, Seoul (KR); Munchae Joung, Seoul (KR); Sunuk Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/064,741

(22) Filed: Mar. 9, 2016

(65) Prior Publication Data

US 2016/0266723 A1    Sep. 15, 2016

(30) Foreign Application Priority Data

Mar. 10, 2015 (KR) .......................... 10-2015-0033216

(51) Int. Cl.
*G06F 3/042* (2006.01)
*G06F 3/044* (2006.01)
(Continued)

(52) U.S. Cl.
CPC ............ *G06F 3/0428* (2013.01); *G06F 3/017* (2013.01); *G06F 3/044* (2013.01); *G06F 3/048* (2013.01);
(Continued)

(58) Field of Classification Search
None
See application file for complete search history.

(56) References Cited

U.S. PATENT DOCUMENTS 6,567,071 B1   5/2003 Curran
6,727,887 B1   4/2004 Levine
(Continued)

FOREIGN PATENT DOCUMENTS

CN    102971701    3/2013
EP    1983402     10/2008
(Continued)

OTHER PUBLICATIONS

Extended European Search Report issued in European Application No. 16159422.1 dated Jul. 29, 2016, 10 pages.
(Continued)

*Primary Examiner* — Ryan A Lubit
(74) *Attorney, Agent, or Firm* — Fish & Richardson P.C.

(57) ABSTRACT

A vehicle display apparatus includes a display, a plurality of light emitting units provided in the periphery of the display, a plurality of light receiving units provided in the periphery of the display, and a processor configured to calculate a position of an approaching external object based on levels of light signals received by the plurality of light receiving units. The plurality of light emitting units sequentially emits light, the plurality of light receiving units sequentially receives light in correspondence with sequential light emission of the plurality of light emitting units, and the processor calculates the position of the external object based on the levels of the light signals received by the plurality of light receiving units in correspondence with sequential light emission of the plurality of light emitting units. Accordingly, it is possible to stably detect the position of the external object positioned in front of the display.

17 Claims, 33 Drawing Sheets

(51) Int. Cl.
*G06F 3/01* (2006.01)
*G06F 3/041* (2006.01)
*G06F 3/048* (2013.01)

(52) U.S. Cl.
CPC .......... *G06F 3/0416* (2013.01); *G06F 3/0421* (2013.01); *B60K 2350/1028* (2013.01); *B60K 2350/1052* (2013.01); *G06F 2203/04101* (2013.01); *G06F 2203/04106* (2013.01); *G06F 2203/04806* (2013.01)

(56) References Cited

U.S. PATENT DOCUMENTS

| | | |
|---|---|---|
| 9,223,054 B2 | 12/2015 | Morita |
| 2008/0006762 A1 | 1/2008 | Fadell et al. |
| 2008/0122803 A1 | 5/2008 | Izadi et al. |
| 2008/0278450 A1 | 11/2008 | Lashina |
| 2009/0058829 A1 | 3/2009 | Kim |
| 2009/0309851 A1 | 12/2009 | Bernstein |
| 2009/0315848 A1 | 12/2009 | Ku |
| 2010/0295821 A1* | 11/2010 | Chang ............ G06F 3/0421 345/175 |
| 2011/0037730 A1 | 2/2011 | Wang |
| 2011/0096033 A1 | 4/2011 | Ko |
| 2011/0141063 A1 | 6/2011 | Grundmann |
| 2011/0310005 A1* | 12/2011 | Chen ............ G06F 1/3203 345/156 |
| 2012/0032923 A1 | 2/2012 | Lu et al. |
| 2012/0154336 A1 | 6/2012 | Lee |
| 2012/0281018 A1 | 11/2012 | Yamamoto |
| 2013/0050079 A1 | 2/2013 | Kao |
| 2013/0194174 A1* | 8/2013 | Bondan ............ G06F 3/005 345/156 |
| 2013/0222332 A1 | 8/2013 | Kyrynyuk |
| 2013/0314365 A1 | 11/2013 | Woolley et al. |
| 2013/0341494 A1 | 12/2013 | Fadell |
| 2013/0342491 A1 | 12/2013 | Liu et al. |
| 2014/0022448 A1 | 1/2014 | McGibney |
| 2015/0062087 A1* | 3/2015 | Cho ............ G02F 1/13338 345/175 |
| 2015/0153571 A1* | 6/2015 | Ballard ............ G02B 27/017 345/8 |
| 2015/0277636 A1* | 10/2015 | Holmgren .......... G02B 19/0028 345/175 |
| 2015/0301688 A1* | 10/2015 | Cho ............ G06F 3/0421 345/175 |
| 2016/0026252 A1* | 1/2016 | McCoy ............ G06F 3/017 345/156 |

FOREIGN PATENT DOCUMENTS

| | | |
|---|---|---|
| EP | 2843509 | 3/2015 |
| EP | 2937765 | 10/2015 |
| FR | 3002052 | 8/2014 |
| JP | 2004071233 | 3/2004 |
| JP | 2013145174 | 7/2013 |
| KR | 10-2009-0095286 | 10/2009 |
| KR | 10-2011-0008313 | 1/2011 |
| KR | 10-2011-0037730 | 4/2011 |
| KR | 10-2013-0111910 | 10/2013 |
| KR | 10-2013-0140188 | 12/2013 |
| KR | 10-2015-0144091 | 12/2015 |
| WO | 2009/028892 | 3/2009 |

OTHER PUBLICATIONS

Welch, G. et al., "Motion Tracking: No Silver Bullet, but a Respectable Arsenal", IEEE Computer Graphics and Applications, IEEE Service Center, New York NY, US, vol. 20, No. 6, Nov. 1, 2002 (Nov. 1, 2002), pp. 24-38, XP011201226, ISSN: 0272-1716.
Chinese Office Action in Chinese Application No. 201410425922.7, dated Feb. 4, 2017, 8 pages.
European Search Report dated Jan. 23, 2015 from European Patent Application No. 14002910.0, 6 pages.
Extended European Search Report issued in European Application No. 15001174.0 dated Oct. 30, 2015, 18 pages.
Office Action issued in Korean Application No. 10-2014-0048217 dated Dec. 1, 2015, 6 pages.
European Search Report dated Jul. 22, 2015 from corresponding European Patent Application No. 15001174.0, 7 pages.

\* cited by examiner

FIG. 7B
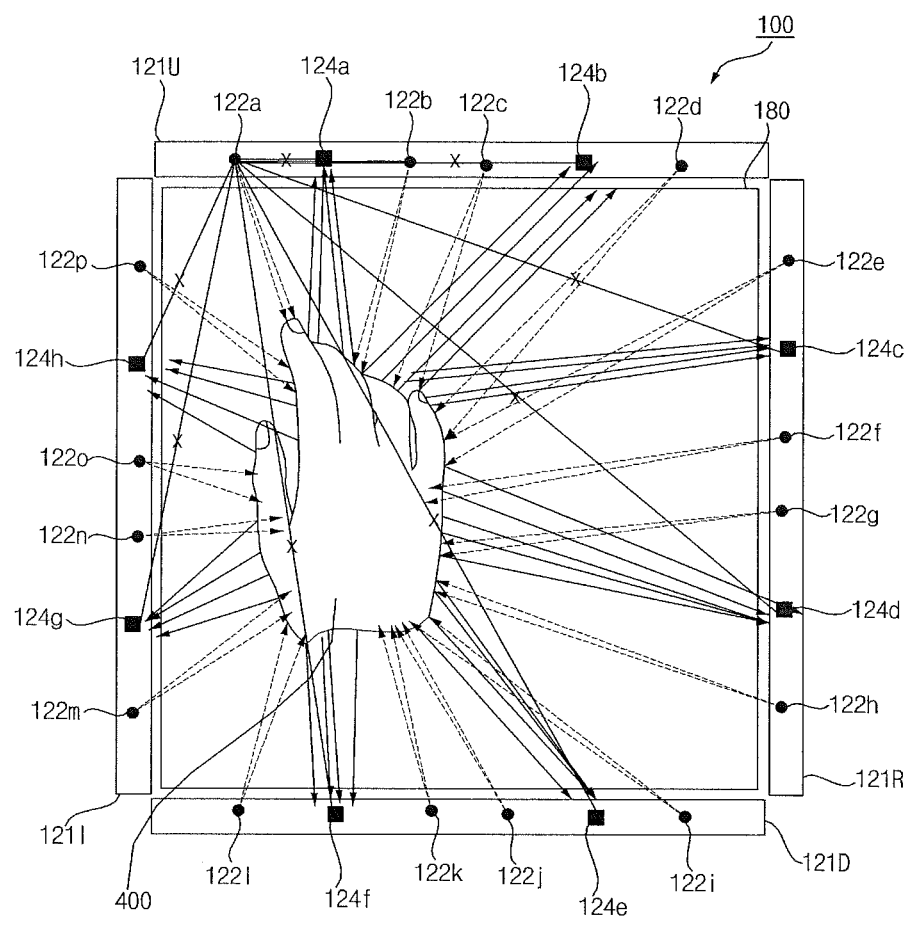
(a)
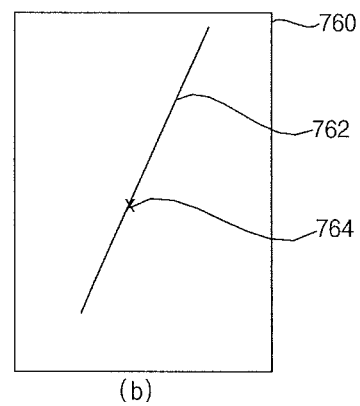
(b)

FIG. 10C
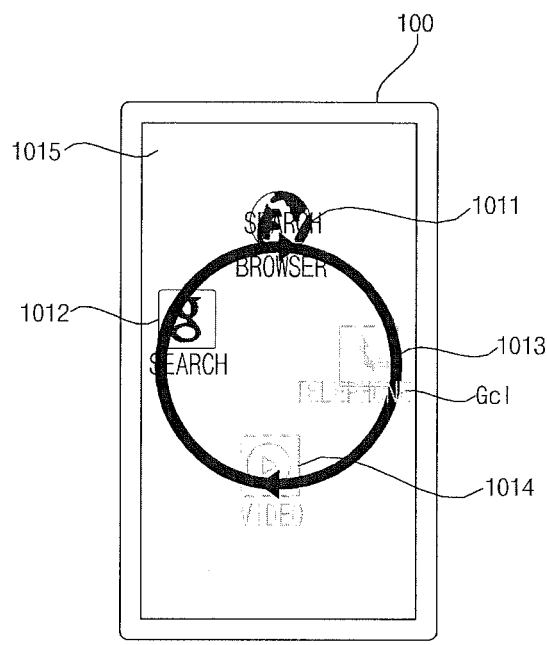
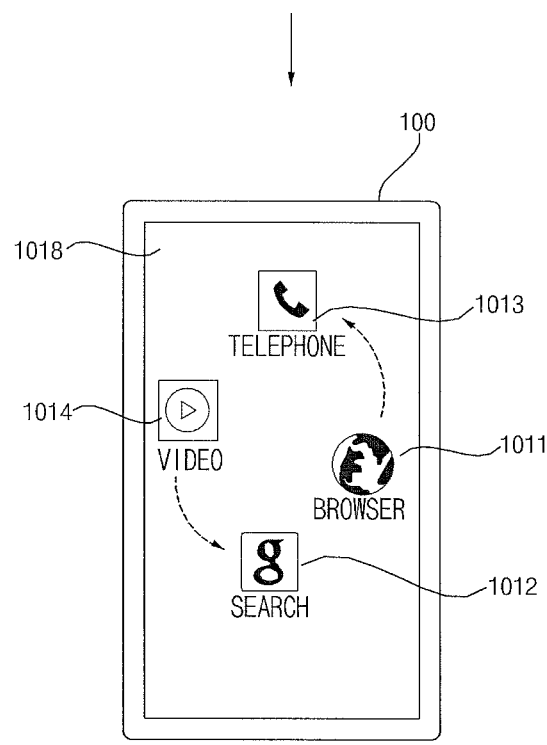

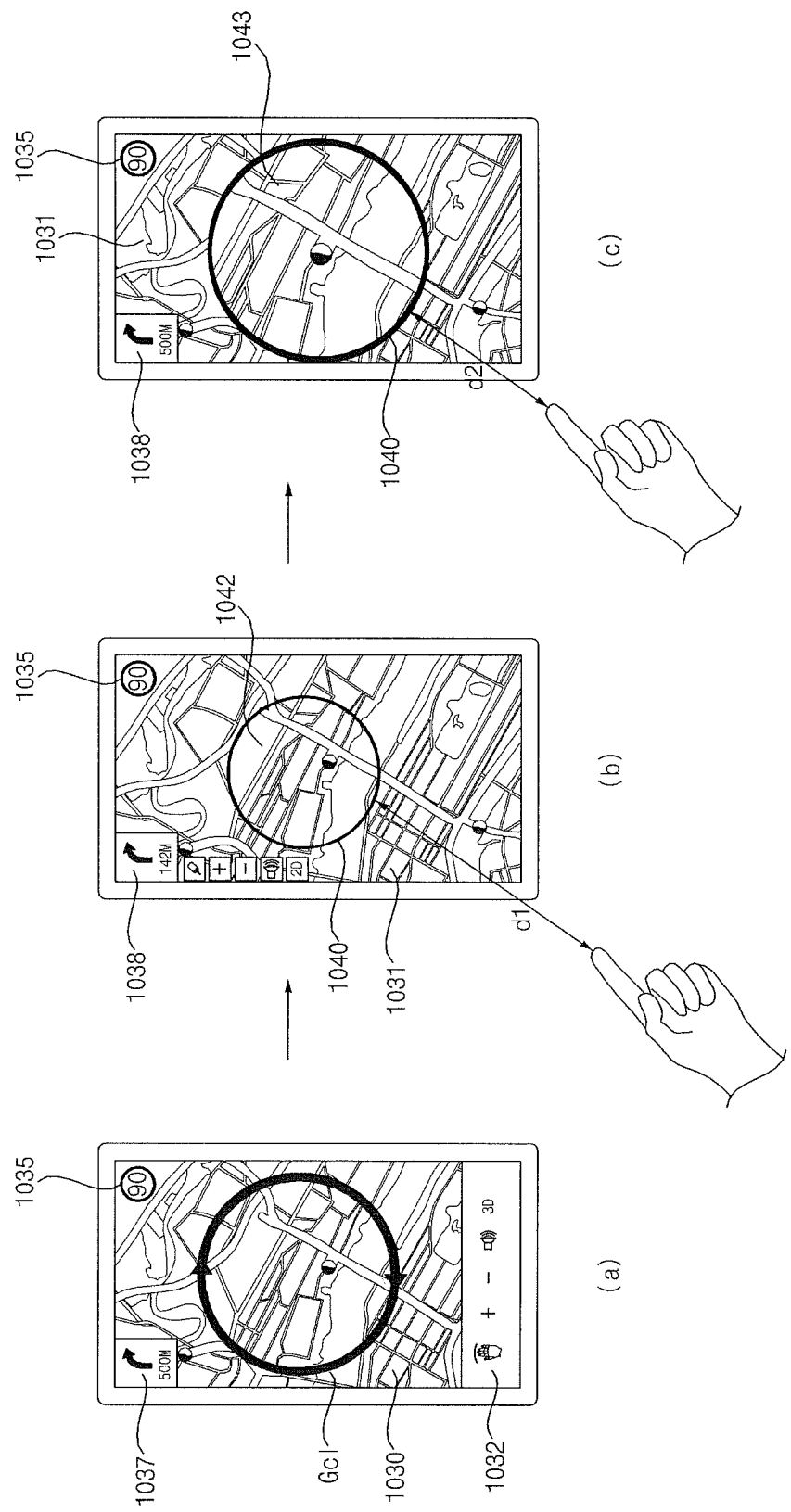

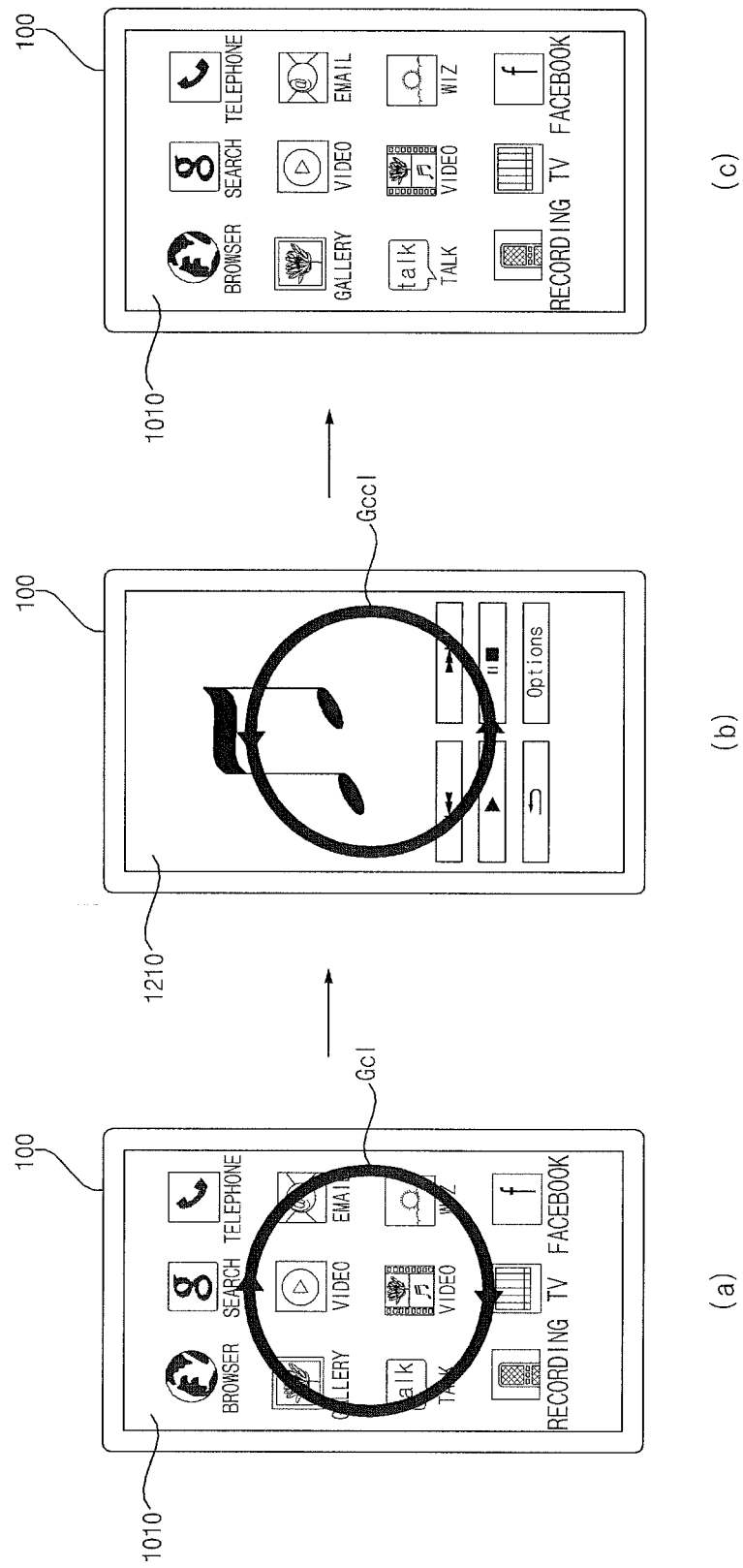

(a)  (b)

VEHICLE DISPLAY APPARATUS INCLUDING CAPACITIVE AND LIGHT-BASED INPUT SENSORS

CROSS-REFERENCE TO RELATED APPLICATION

This application claims the priority benefit of Korean Patent Application No. 10-2015-0033216, filed on Mar. 10, 2015 in the Korean Intellectual Property Office, the disclosure of which is incorporated herein by reference.

BACKGROUND OF THE INVENTION

1. Field of the Invention

The present invention relates to a vehicle display apparatus, and, more particularly, to a vehicle display apparatus capable of stably detecting the position of an external object positioned in front of a display.

2. Description of the Related Art

A vehicle is an apparatus driven by a user in a desired direction. A representative example of the vehicle is a car.

A variety of research into a display apparatus for providing a variety of information to a user riding in a vehicle has been conducted.

Recently, with development of touch technology and three-dimensional (3D) technology, research into 3D interaction technology has been actively conducted.

3D interaction refers to technology of sensing Z-axis input in addition to sensing of X-axis and Y-axis input through an existing touch sensor. Efforts for implementing proximity touch or space recognition in a vehicle based on a camera or ultrasonic waves are being made.

SUMMARY OF THE INVENTION

Therefore, the present invention has been made in view of the above problems, and it is an object of the present invention to provide a vehicle display apparatus capable of stably detecting the position of an external object positioned in front of a display.

Another object of the present invention is to provide a vehicle display apparatus for easily entering a zoom mode if user gesture corresponds to a first-direction circular trajectory.

In accordance with an aspect of the present invention, the above and other objects can be accomplished by the provision of a vehicle display apparatus including a display, a plurality of light emitting units provided in the periphery of the display, a plurality of light receiving units provided in the periphery of the display, and a processor configured to calculate a position of an approaching external object based on levels of light signals received by the plurality of light receiving units, wherein the plurality of light emitting units sequentially emits light, wherein the plurality of light receiving units sequentially receives light in correspondence with sequential light emission of the plurality of light emitting units, and wherein the processor calculates the position of the external object based on the levels of the light signals received by the plurality of light receiving units in correspondence with sequential light emission of the plurality of light emitting units.

BRIEF DESCRIPTION OF THE DRAWINGS

The above and other objects, features and other advantages of the present invention will be more clearly understood from the following detailed description taken in conjunction with the accompanying drawings, in which:

FIGS. 6A to 6I and 7A to 7C are views referred to for describing the method for operating the display apparatus of FIG. 5;

FIGS. 10A to 17 are views referred to describing operation for providing various user interfaces according to trajectory tracking of a hand in a display apparatus.

DETAILED DESCRIPTION OF THE PREFERRED EMBODIMENTS

Exemplary embodiments of the present invention will be described in detail with reference to the attached drawings.

The terms "module" and "unit" attached to describe the names of components are used herein to aid in understanding of the components and thus they should not be considered as having specific meanings or roles. Accordingly, the terms "module" and "unit" may be used interchangeably.

A vehicle described in the present specification includes a car, a motorcycle and a bicycle. Hereinafter, as a vehicle, a car will be focused upon.

A vehicle display apparatus described in the present specification may be an audio/video navigation (AVN) apparatus.

Figure 1:
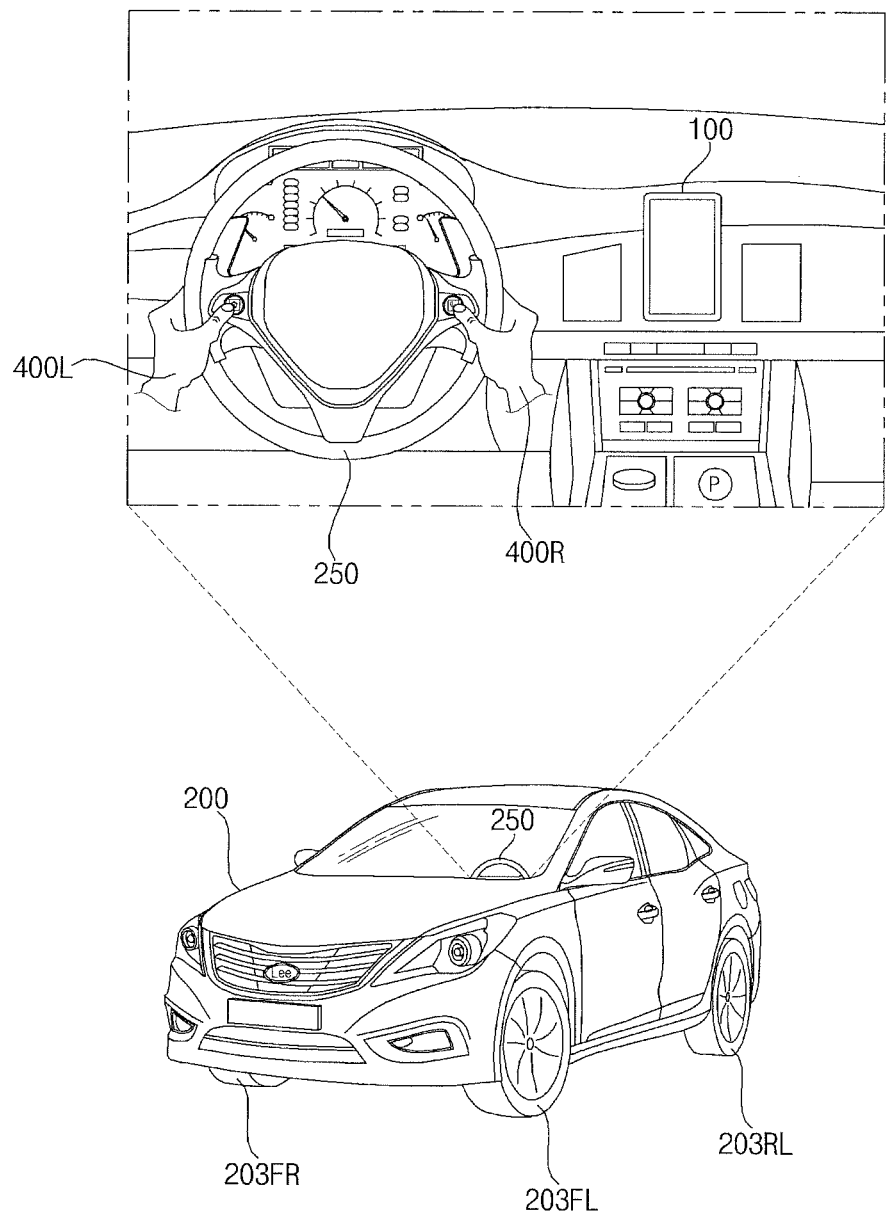
FIG. 1 is a diagram showing a vehicle display apparatus according to one embodiment of the present invention.

FIG. 1 is a diagram showing a vehicle display apparatus according to one embodiment of the present invention.

Referring to the figure, a vehicle 200 may include wheels 203FR, 203FL, 203RL, . . . rotated by a power source, a handle 250 for adjusting the travel direction of the vehicle 200, and a display apparatus 100 for providing information to a user.

At this time, the vehicle 200 may include an engine for supplying power based on fossil fuel or an electric motor for supplying power using a DC power source such as a solar cell or a battery. The vehicle may further include a transmission for converting power from the engine into rotation force and a brake for stopping movement of the vehicle.

The vehicle 200 described in the present invention may include a vehicle including an engine, a hybrid vehicle including an engine and an electric motor and an electric vehicle including an electric motor.

Figure 3:
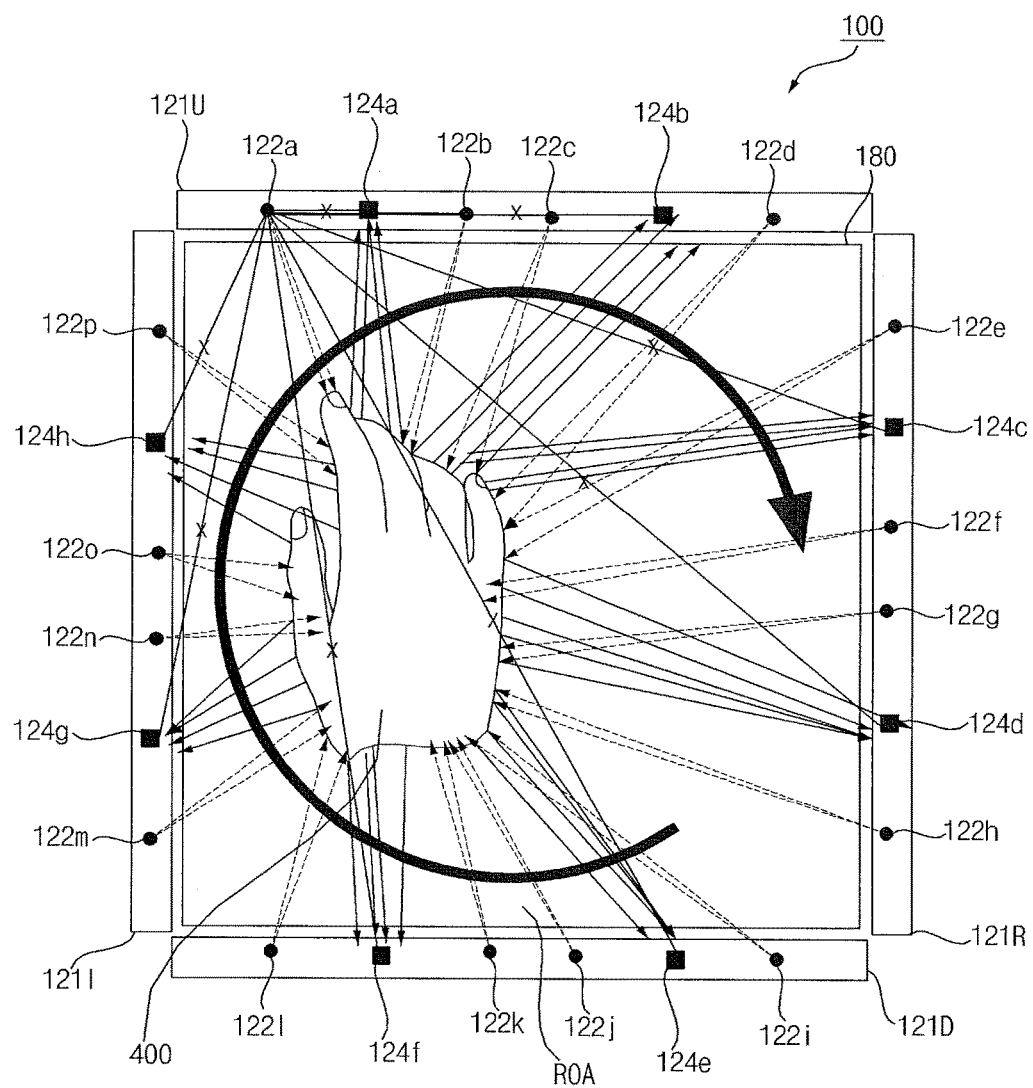
FIG. 3 is a diagram schematically showing the structure of the display apparatus of FIG. 1.

The vehicle display apparatus 100 according to the embodiment of the present invention includes a plurality of light emitting units (122a, . . . , 122p of FIG. 3) provided in the periphery of a display 180, a plurality of light receiving units (124a, . . . , 124h of FIG. 3) provided in the periphery of the display 180, and a processor (170 of FIG. 4) configured to calculate the position of an approaching external object based on the levels of light signals received by the plurality of light receiving units (124a, . . . , 124h of FIG. 3). The plurality of light emitting units 122a, . . . , 122p may sequentially emit light, the plurality of light receiving units (124a, . . . , 124h of FIG. 3) may sequentially receive light in correspondence with sequential light emission of the plurality of light emitting units (122a, . . . , 122p of FIG. 3), the processor (170 of FIG. 4) may calculate the position of the external object based on the levels of the light signals received by the plurality of light receiving units (124a, . . . , 124h of FIG. 3) in correspondence with sequential light emission of the plurality of light emitting units (122a, . . . , 122p of FIG. 3).

Using the plurality of light emitting units and light receiving units, the position of the external object is calculated based on the output light and the received light, such that a blind spot does not occur upon recognizing a user's hand in front of the display apparatus. In addition, a user's hand detection speed is high and the present invention is applicable to a large display apparatus.

The plurality of light emitting units 122a, . . . , 122p and the plurality of light receiving units 124a, . . . , 124h may be included in a space sensor (121 of FIG. 4) for sensing approaching or movement of a user's hand.

The display apparatus of FIG. 1 will be described in detail with reference to the following drawings.

Figure 2A:
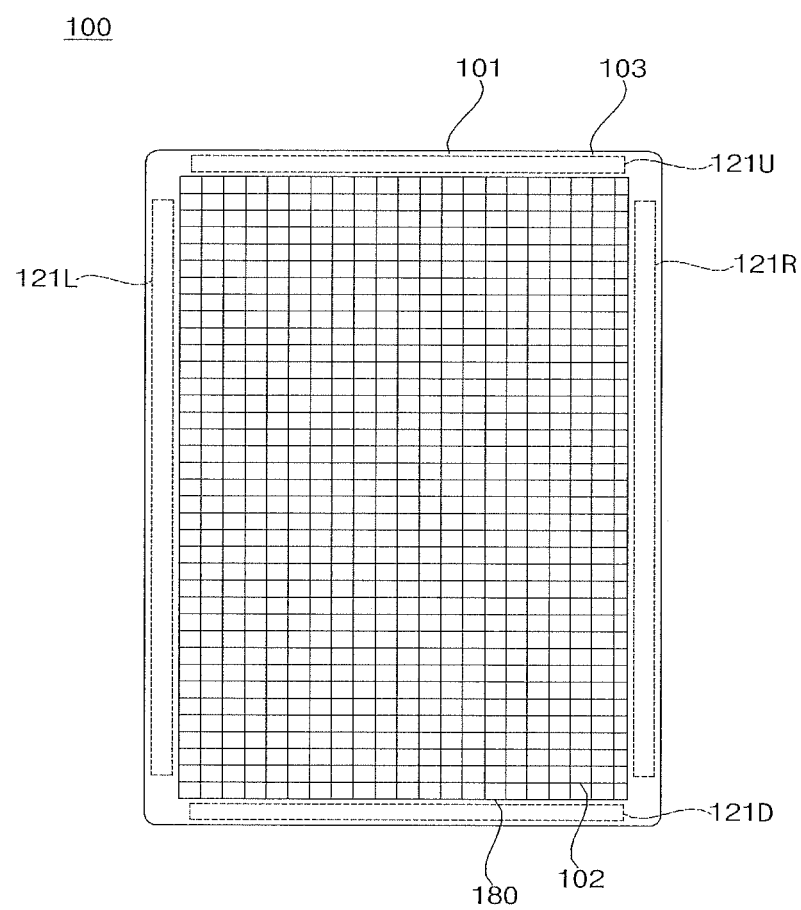
FIGS. 2A to 2C are diagrams illustrating the structure of the display apparatus of FIG. 1.
Figure 2B:
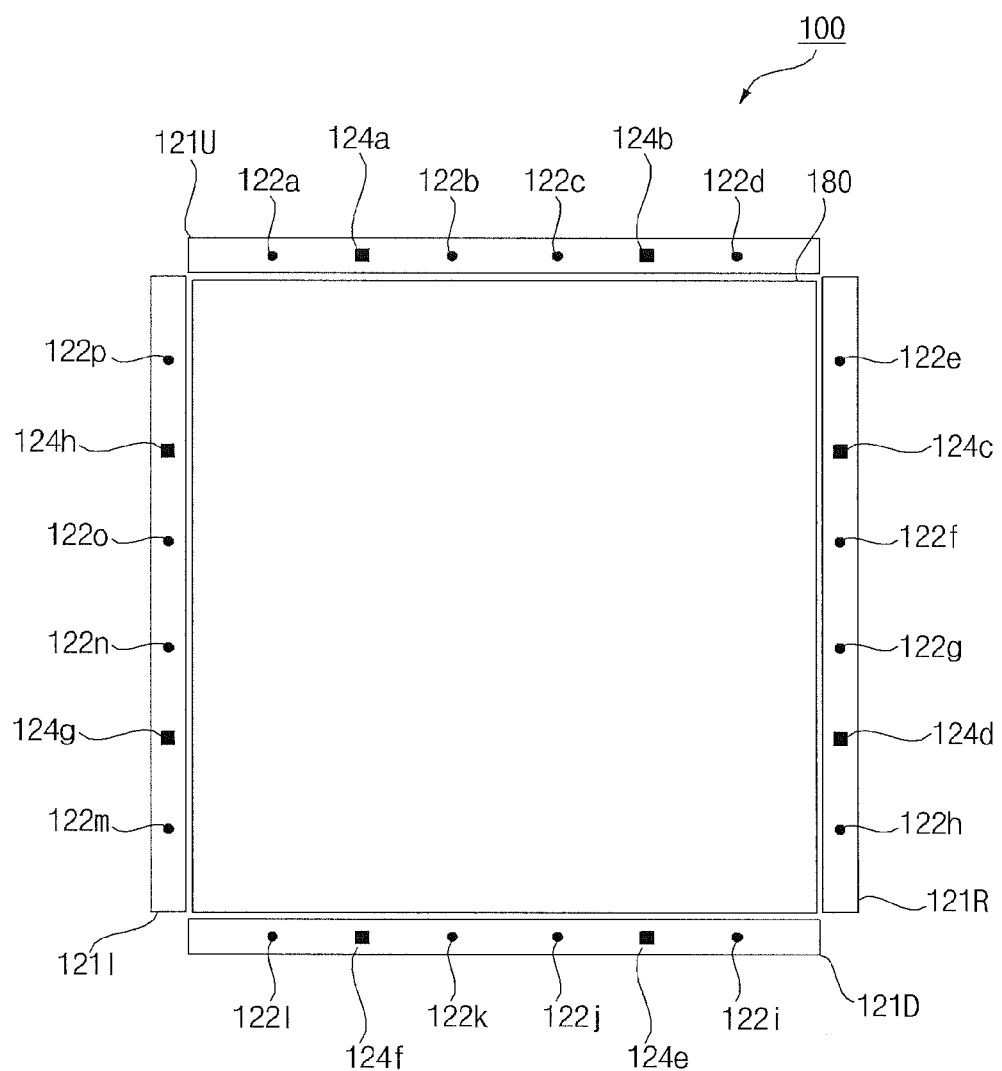
Figure 2C:
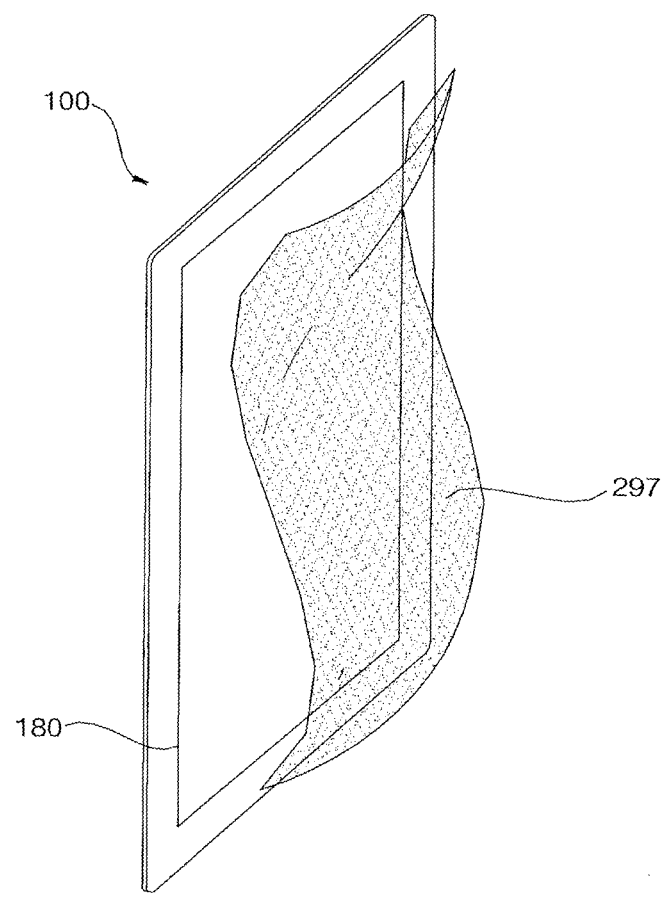

FIGS. 2A to 2C are diagrams illustrating the structure of the display apparatus of FIG. 1.

First, FIG. 2A is a front view of the display apparatus of FIG. 1.

Referring to FIG. 2A, the entire area of the display apparatus 100 may be divided into a display area 102 and a peripheral area 101 corresponding to an edge area located at the periphery of the display area.

The display 180 and a touch sensor 126 provided on an upper or lower surface of the display 180 may be provided in the display area 102 and a bezel frame 103 and a space sensor 121 may be provided in the peripheral area 101.

In FIG. 2A, four space sensors 121L, 121R, 121U and 121D are provided on the left, right, up and down peripheral areas of the peripheral area 101.

The area of the touch sensor 126 is preferably equal to that of the display 180. Therefore, touch input of the entire area of the display 180 can be sensed.

The touch sensor 126 according to the embodiment of the present invention may sense approaching of a user finger within a predetermined distance value in addition to direct touch of the display apparatus 100. Approaching of a user finger may be referred to as floating touch or hovering. Hereinafter, the term floating touch will be mainly used.

Next, FIG. 2B shows the plurality of light emitting units 122a, . . . , 122p and the plurality of light receiving units 124a, . . . , 124h included in the space sensor 121 of the display apparatus 100.

In the figure, in consideration of loss of the output light signal, the number of light emitting units 122a, . . . , 122p provided in the periphery of the display 180 is greater than the number of light receiving units 124a, . . . , 124h provided in the periphery of the display 180.

More specifically, the number of light emitting units 122a, . . . , 122p is 16 and the number of light receiving units 124a, . . . , 124h is 8.

The plurality of light emitting units 122a, . . . , 122p is 16 and the plurality of light receiving units 124a, . . . , 124h are preferably spaced apart from each other.

FIG. 2C shows an area 297 recognized by the space sensor 121 of FIG. 2A or 2B. Referring to the figure, the entire area of the display 180 may be recognized by the space sensor 121.

FIG. 3 is a diagram schematically showing the structure of the display apparatus of FIG. 1.

Referring to the figure, the display apparatus 100 may include the plurality of light emitting units 122a, . . . , 122p provided in the periphery of the display 180 and the plurality of light receiving units 124a, . . . , 124h provided in the periphery of the display 180, for calculation of the position of the external object positioned in front of the display.

In the figure, four light emitting units 122a to 122d and two light receiving units 124a and 124b interposed between the four light emitting units 122a to 122d are provided on the upper side of the display 180, four light emitting units 122e to 122h and two light receiving units 124c and 124d interposed between the four light emitting units 122e to 122h are provided on the right side of the display 180, four light emitting units 122i to 122l and two light receiving units 124e and 124f interposed between the four light emitting units 122i to 122l are provided on the lower side of the display 180, and four light emitting units 122m to 122p and two light receiving units 124g and 124h interposed between the four light emitting units 122m to 122p are provided on the left side of the display 180.

In the figure, the plurality of light emitting units 122a, . . . , 122p sequentially emits light in a clockwise direction ROA.

Figure 4:
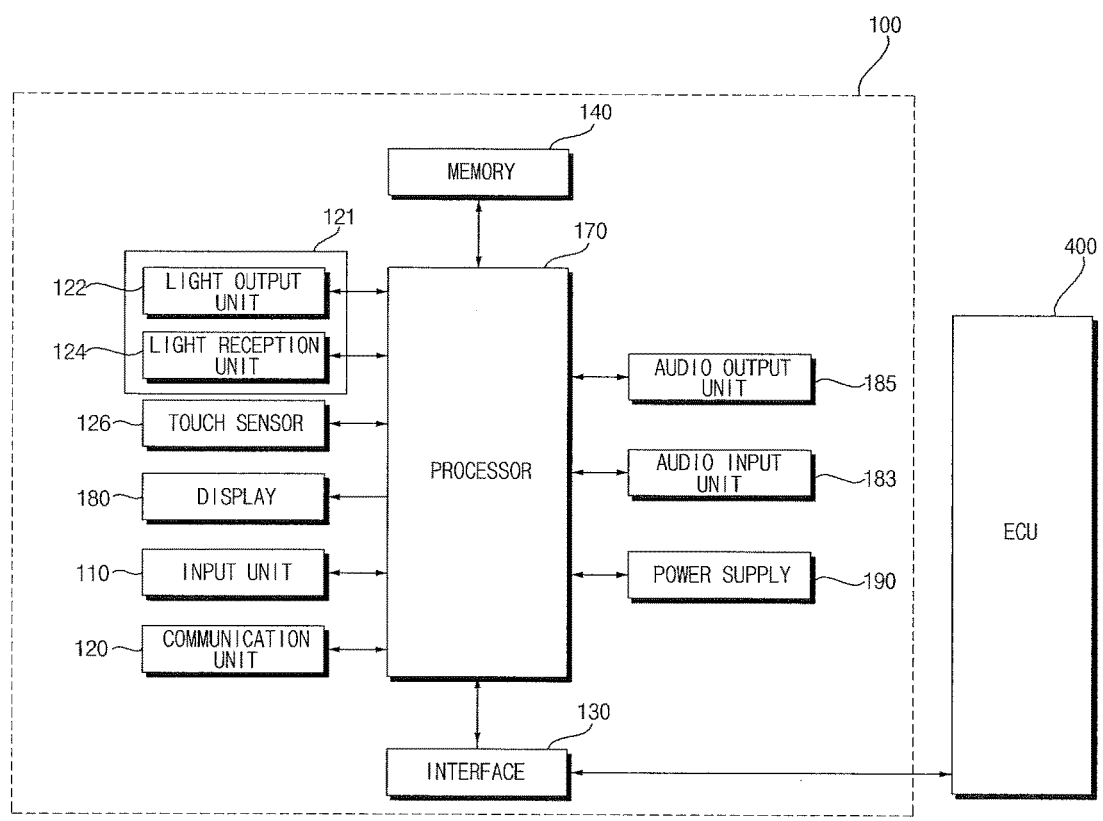
FIG. 4 is a block diagram showing the internal configuration of the display apparatus of FIG. 1.

The processor 170 of FIG. 4 may calculate the position of the external object based on the levels of the light signals received by the plurality of light receiving units 124a, . . . , 124b in correspondence with sequential light emission of the plurality of light emitting units 122a, . . . , 122p. In particular, the processor may calculate the position of the user's hand 400.

FIG. 4 is a block diagram showing the internal configuration of the display apparatus of FIG. 1.

Referring to the figure, the vehicle display apparatus 100 according to the embodiment of the present invention may include an input unit 110, a communication unit 120, a space sensor 121, a touch sensor 126, an interface 130, a memory 140, a processor 170, a display 180, an audio input unit 183, an audio output unit 185 and a power supply 190.

The input unit 110 includes a button attached to the display apparatus 100, for example, a power button. In addition, the input unit may further include at least one of a menu button, up and down buttons and left and right buttons.

The input signal received by the input unit 110 may be sent to the processor 170.

The communication unit 120 may exchange data with an adjacent electronic apparatus, for example, an in-vehicle electronic apparatus or a server (not shown) wirelessly. In particular, the communication unit may exchange data with a mobile terminal of a vehicle driver wirelessly. A wireless data communication method may include various data communication methods such as Bluetooth, Wi-Fi, APiX, etc.

For example, if a user rides in a vehicle, the mobile terminal of the user and the display apparatus 100 may perform pairing automatically or by application execution of the user.

The communication unit 120 may include a GPS reception apparatus and may receive GPS information, that is, vehicle position information, via the GPS reception apparatus.

The space sensor 121 may sense approaching or movement of a user's hand.

The space sensor 121 may be provided in the periphery of the display 180 as described with reference to FIGS. 2A to 2C.

The space sensor 121 may perform space recognition based on light or ultrasonic waves. Hereinafter, space recognition based on light will be focused upon.

The space sensor 121 may sense approaching or movement of the user's hand based on output light and received light corresponding thereto. In particular, the processor 170 may perform signal processing with respect to an electrical signal of the output light and the received light.

The space sensor 121 may include a light output unit 122 and a light reception unit 124.

The light output unit 122 may include a plurality of light emitting units 122a, . . . , 122p provided in the periphery of the display 180 as shown in FIG. 3, in order to sense the user's hand positioned in front of the display apparatus 100.

The plurality of light emitting units 122a, . . . , 122p may sequentially emit light. The output light emitted from the plurality of light emitting units 122a, . . . , 122p may be infrared (IR) light.

When the light output from the light output unit 122 is scattered or reflected from the user's hand positioned in front of the display apparatus 100, the light reception unit 124 receives the scattered or reflected light.

The light reception unit 124 may include the plurality of light receiving units 124a, . . . , 124h provided in the periphery of the display 180 as shown in FIG. 3, in order to sense the user's hand positioned in front of the display apparatus 100.

The plurality of light receiving units 124a, . . . , 124h may sequentially receive the output light sequentially emitted from the plurality of light emitting units 122a, . . . , 122p).

The light reception unit 124 may include a photodiode to convert the received light into an electrical signal via the photodiode. The converted electrical signal may be input to the processor 170.

The touch sensor 126 senses floating touch and direct touch. The touch sensor 126 may include an electrode array, an MCU, etc. If the touch sensor operates, the electrical signal is supplied to the electrode array and an electric field is formed on the electrode array.

The touch sensor 126 may operate when the intensity of light received by the space sensor 121 is equal to or greater than a first level.

That is, when the user's hand approaches the display apparatus within a predetermined distance value, the electrical signal may be supplied to the electrode array of the touch sensor 126. By the electrical signal supplied to the electrode array, the electric field is formed on the electrode array and capacitance change is sensed using such an electric field. Based on the sensed capacitance change, floating touch and direct touch are sensed.

In particular, through the touch sensor 126, z-axis information as well as x-axis information and y-axis information may be sensed according to approaching of the user's hand.

The interface 130 may exchange data with another electronic apparatus installed in the vehicle. For example, the interface 130 may perform data communication with an electronic control unit (ECU) of the vehicle by a wired communication method.

More specifically, the interface 130 may receive vehicle state information through data communication with the ECU of the vehicle.

Here, the vehicle state information may include at least one of battery information, fuel information, vehicle speed information, tire information, steering information, vehicle lamp information, vehicle internal-temperature information, vehicle external-temperature information and vehicle internal-humidity information.

The interface 130 may further receive GPS information from the ECU of the vehicle. Alternatively, the interface may transmit GPS information received from the display apparatus 100 to the ECU.

The memory 140 may store a variety of data for operation of the display apparatus 100, such as programs for processing or control of the processor 170.

For example, the memory 140 may store a map for guiding a driving path of the vehicle.

As another example, the memory 140 may store user information and mobile terminal information of the user, for pairing with the mobile terminal of the user.

The audio output unit 185 may convert the electrical signal from the processor 170 into an audio signal and output the audio signal. The audio output unit may include a speaker. The audio output unit 185 may output sound corresponding to operation of the input unit 110, that is, the button.

The audio input unit 183 may receive user voice. The audio input unit may include a microphone. The received voice may be converted into an electrical signal and sent to the processor 170.

The processor 170 may control operation of each unit of the vehicle display apparatus 100.

For example, the processor 170 may change at least one of the functions of the plurality of the buttons based on a user manipulation signal received via the input unit.

In association with the embodiment of the present invention, the processor 170 may calculate the position of the external object based on the levels of the light signals received by the plurality of light receiving units 124a, . . . , 124h in correspondence with sequential light emission of the plurality of light emitting units 122a, . . . , 122p.

Figure 8:
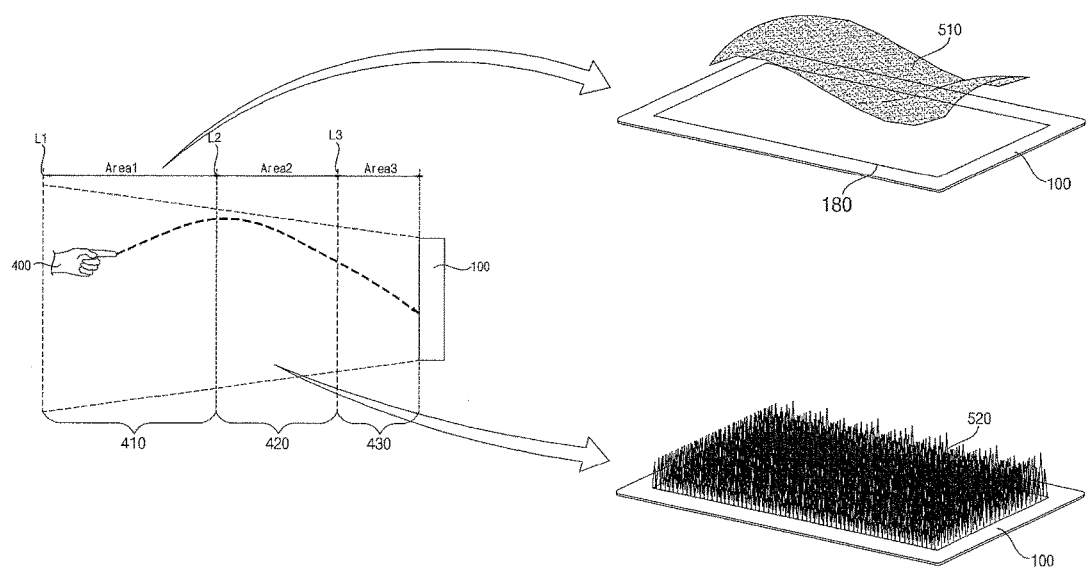
FIG. 8 is a view referred to for describing operation of a space sensor and a touch sensor of FIG. 4.

In particular, the processor 170 may detect the position of the external object via the space sensor 121, when the distance value of the external object is between a first distance value L1 and a second distance value L2 or between a second distance value L2 and a third distance value L3 of FIG. 8.

For example, the processor 170 may control sequential light emission of the plurality of light emitting units 122a, . . . , 122p and calculate the position of the external object based on the levels of the light signals sequentially received by the plurality of light receiving units 124a, . . . , 124h.

More specifically, the processor 170 may set a plurality of center points between the plurality of light emitting units 122a, . . . , 122p and the plurality of light receiving units 124a, . . . , 124h and calculate the position of the external object based on a light signal pattern of the received light corresponding to each of the plurality of center points and the levels of the light signals received by the plurality of light receiving units 124a, . . . , 124h.

Alternatively, the processor 170 may set a plurality of center points between the plurality of light emitting units 122a, . . . , 122p and the plurality of light receiving units 124a, . . . , 124h, select any one of the plurality of center points based on the levels of the light signals received by the plurality of light receiving units 124a, . . . 124h, and calculate the selected center point as the position of the external object.

The processor 170 may calculate the position of the external object and then calculate the distance value of the external object based on the level of the light signal.

The above-described external object may correspond to the user's hand.

The processor 170 may detect the position of the external object via the touch sensor 126 when the distance value of the external object is between the second distance value L2 and a third distance value L3 of FIG. 8 or is within the third distance value L3.

The processor 170 may control entrance into a zoom mode for zooming in/out at least a part of an image displayed on the display 180, when the trajectory of the user's hand corresponds to a first-direction circular trajectory.

The processor 170 may control zoom-in of at least a part of the image displayed on the display 180 when the user's hand approaches the display 180 and control zoom-out of at least a part of the image displayed on the display 180 when the user's hand moves away from the display 180, after entering the zoom mode.

The processor 170 may control entrance into a zoom mode for zooming in or out a map image when input corresponding to the first-direction circular trajectory is received in a state of displaying the map image on the display 180.

The processor 170 may control display of a magnifier object for zooming in or out the map image on the display 180, when input corresponding to the first-direction circular trajectory is received in a state of displaying the map image on the display 180.

The processor 170 may control end of the zoom mode if the trajectory of the user's hand corresponds to a second-direction circular trajectory different from the first-direction circular trajectory, after entering the zoom mode.

The processor 170 may control disappearance of the magnifier object, when the trajectory of the user's hand corresponds to the second-direction circular trajectory different from the first-direction circular trajectory in a state in which the magnifier object for zooming in or out the map image displayed on the display 180 is displayed, in the zoom mode.

The processor 170 may control entrance into the zoom mode for zooming in or out the map image when the input corresponding to the first-direction circular trajectory is received in a state of displaying the map image on the display 180 and control display of a second menu screen or a pre-set application execution screen when input corresponding to the first-direction circular trajectory is received in a state of displaying a first menu screen.

The processor 170 may control display of a third menu screen when input corresponding to the first-direction circular trajectory is received in a state of displaying the second menu screen or the pre-set application execution screen.

The processor 170 may control display of the first menu screen when input corresponding to the second-direction circular trajectory different from the first-direction circular trajectory is received in a state of displaying the second menu screen.

The processor 170 may control display of a settings screen for controlling at least one of in-vehicle air conditioner settings, lamp settings, volume settings, window settings and sunroof settings, when input corresponding to the first-direction circular trajectory is continuously received in a state of displaying the map image on the display 180.

The processor 170 may detect all paths, areas and positions of the hand (hand detection) until touch input is received if the user's hand sequentially approaches the display in a state of being positioned in front of the display apparatus and, more particularly, detect a finger (finger detection) when the distance value of the hand is within the third distance value (L3 of FIG. 8).

More specifically, when the distance value of the user's hand 400 is between the first distance value (L1 of FIG. 8) and the second distance value (L2 of FIG. 8) from the display apparatus 100, the processor 170 receives the electrical signal corresponding to light received by the space sensor 121.

The processor 170 may calculate the position information corresponding to the position of the user's hand based on the electrical signal from the space sensor 121. More specifically, the x-axis and y-axis information of the user's hand relative to the display apparatus 100 may be calculated. In addition, based on the intensity (amplitude) of the electrical signal from the space sensor 121, z-axis information which is a distance value between the display apparatus 100 and the user's hand may be approximately calculated.

When the user's hand continuously approaches the display apparatus 100, the processor 170 may continuously calculate the x-, y- and z-axis information of the user's hand based on light received by the light reception unit 124. At this time, the z-axis information may be sequentially decreased.

When the user's hand approaches the display 180 within the second distance value (L2 of FIG. 8) closer to the display 180 than the first distance value (L1 of FIG. 8), the processor 170 may control operation of the touch sensor 126. That is, the processor 170 may control operation of the touch sensor 126 if the intensity of the electrical signal from the space sensor 121 is equal to or greater than a reference level. Therefore, the electrical signal is supplied to the electrode array of the touch sensor 126.

The processor 170 may sense floating touch based on the sensing signal sensed by the touch sensor 126 when the user's hand is positioned within the second distance value (L2 of FIG. 8). In particular, the sensing signal may be a signal indicating capacitance change.

The processor 170 calculates the x- and y-axis information of floating touch input based on the sensing signal and calculates the z-axis information, which is the distance value between the display apparatus 100 and the user's hand, based on the intensity of the capacitance change.

The processor 170 may change grouping of the electrode array in the touch sensor 126 according to the distance value of the user's hand.

More specifically, the processor 170 may change grouping of the electrode array in the touch sensor 126 based on the approximate z-axis information calculated based on the light received by the space sensor 121. As the distance value is increased, the size of the electrode array group may be increased.

That is, the processor 170 may change the size of the touch sensing cell of the electrode arrays in the touch sensor 126 based on the distance information of the user's hand, that is, the z-axis information.

For example, when the position of the user's hand is between the second distance value (L2 of FIG. 8) and the third distance value (L3 of FIG. 8), by grouping of the electrode array, the size of the touch sensing cell (grouped electrodes) may correspond to that of four electrode cells. When the position of the user's hand is within the third distance value (L3 of FIG. 8), the size of the touch sensing cell (grouped electrodes) corresponds to that of one electrode cell.

The size of the touch sensing cell (grouped electrodes) may be changed by changing the electrical signal applied to the electrode array.

For example, when the size of the touch sensing cell (grouped electrodes) corresponds to the size of four electrode cells, the electrical signal is applied to only a first horizontal electrode and a third horizontal electrode among the first to third horizontal electrodes and a first vertical electrode and a third vertical electrode among the first to third vertical electrodes, such that the size of the touch sensing cell (grouped electrodes) corresponding to the size of four electrode cells is set.

As another example, when the size of the touch sensing cell (grouped electrodes) corresponds to that of one electrode cell, the electrical signal is applied to the horizontal electrodes and the vertical electrodes, such that the size of the touch sensing cell (grouped electrodes) corresponding to the size of one electrode cell is set.

As a result, the level of power consumed by the electrode array in the touch sensor 126 may be changed according to the distance value of the user's hand. As the distance value of the user's hand is decreased, the level of power consumed by the electrode array in the touch sensor 126 is increased.

The touch sensor 126 senses capacitance change by the user's hand in the electric field formed in front of the display apparatus 100.

The processor 170 may calculate x- and y-axis information of floating touch input based on the sensed capacitance change. In addition, the z-axis information, which is the distance value between the display apparatus 100 and the user's hand, may be calculated based on the capacitance change.

The processor 170 may calculate the position information of the user's hand based on a capacitance change signal having a highest intensity among the sensed capacitance change signals, when the capacitance change signal of the user's hand is sensed in some of the plurality of sensing cells in a state in which the user's hand is positioned within the second distance value (L2 of FIG. 8). That is, only one of a plurality of floating touches may be recognized. Alternatively, all of the plurality of floating touches may be recognized. When the plurality of floating touches is recognized, capacitance change signals having intensities equal to or greater than a predetermined level may be recognized.

The touch sensor 126 may be provided on the upper or lower surface of the display 180.

The display 180 may separately display an image corresponding to the function of a button. For image display, the display 180 may be implemented as various display modules such as an LCD or an OLED. The display 180 may be implemented as an in-vehicle cluster.

The power supply 190 may supply power necessary for operation of each component under control of the processor 170.

Figure 5:
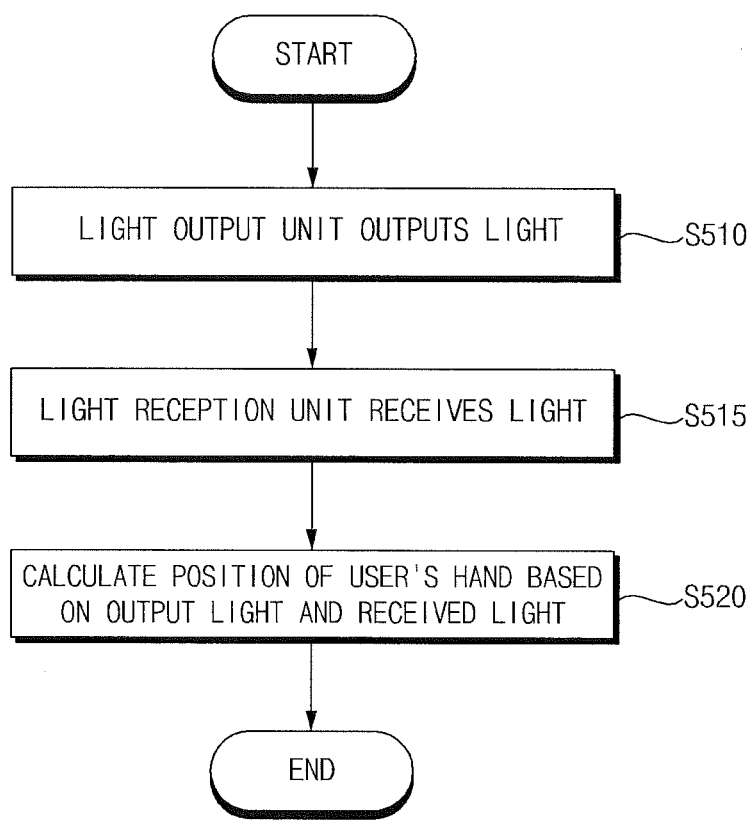
FIG. 5 is a flowchart illustrating a method for operating a display apparatus according to one embodiment of the present invention.

FIG. 5 is a flowchart illustrating a method for operating a display apparatus according to one embodiment of the present invention. FIGS. 6A to 7C are views referred to for describing the method for operating the display apparatus of FIG. 5.

First, the plurality of light emitting units 122a, . . . , 122 provided in the periphery of the display 180 sequentially outputs light (S510).

Then, the plurality of light receiving units 124a, . . . , 124h provided in the periphery of the display 180 sequentially receives output light (S515).

The processor 170 calculates the position of the external object, for example, the user's hand, based on the output light emitted from the plurality of light emitting units 122a, . . . , 122p and the light received by the plurality of light receiving units 124a, . . . , 124h (S520).

In association with the embodiment of the present invention, the processor 170 may calculate the position of the external object based on the levels of the light signals received by the plurality of light receiving units 124a, . . . , 124h in correspondence with sequential light emission of the plurality of light emitting units 122a, . . . , 122p.

In particular, the processor 170 may detect the position of the external object via the space sensor 121 when the distance value of the external object is between the first distance value L1 and the second distance value L2 of FIG. 8.

For example, the processor 170 may control sequential light emission of the plurality of light emitting units 122a, . . . , 122p and calculate the position of the external object based on the levels of the light signals sequentially received by the plurality of light receiving units 124a, . . . , 124h.

More specifically, the processor 170 may set a plurality of center points between the plurality of light emitting units 122a, . . . , 122p and the plurality of light receiving units 124a, . . . , 124h and calculate the position of the external object based on a light signal pattern of the received light corresponding to each of the plurality of center points and the levels of the light signals received by the plurality of light receiving units 124a, . . . , 124h.

Alternatively, the processor 170 may set a plurality of center points between the plurality of light emitting units 122a, . . . , 122p and the plurality of light receiving units 124a, . . . , 124h, select any one of the plurality of center points based on the level of each of the light signals received by the plurality of light receiving units 124a, . . . , 124h, and calculate the selected center point as the position of the external object.

The processor 170 may calculate the position of the external object and then calculate the distance value of the external object based on the level of the light signal.

The above-described external object may correspond to the user's hand.

The processor 170 may detect the position of the external object via the touch sensor 126 when the distance value of the external object is between the second distance value L2 and a third distance value L3 of FIG. 8 or within the third distance value L3.

Figure 6A:
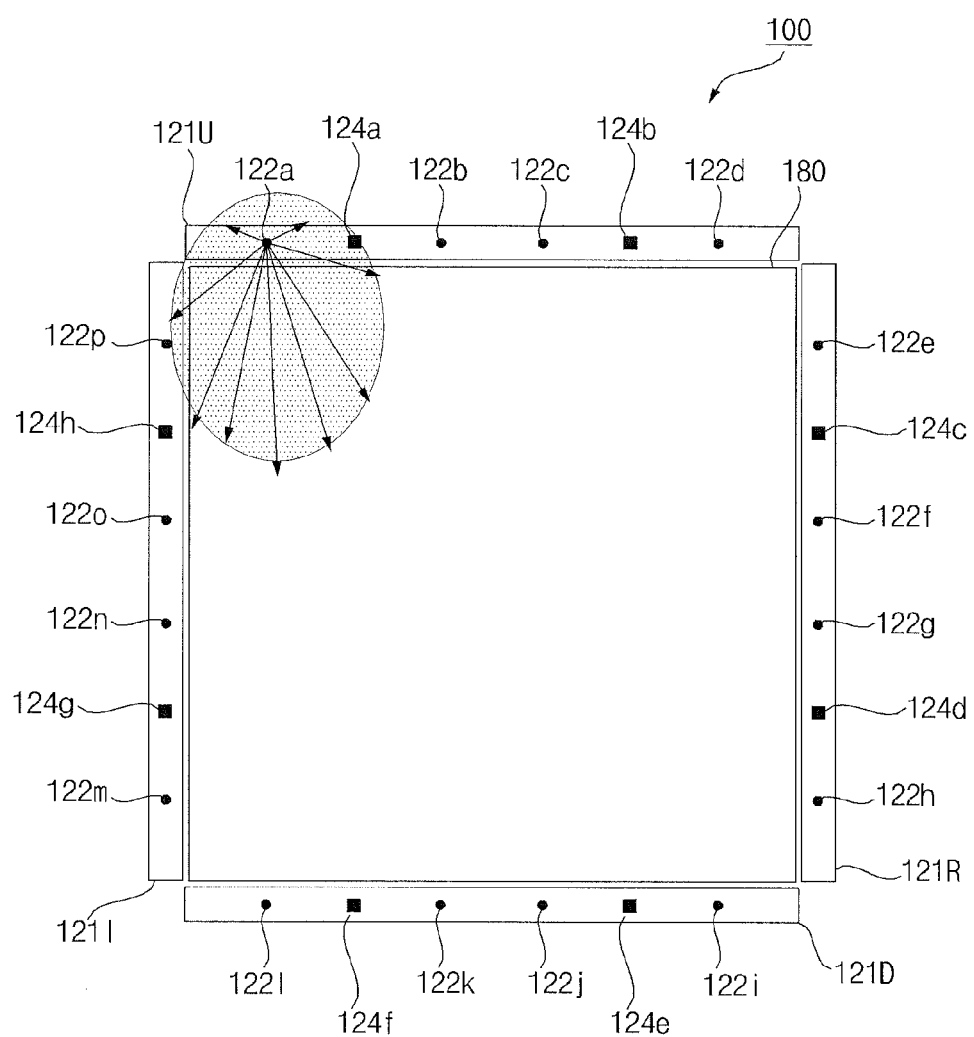

FIG. 6A shows light output from the first light emitting unit 122a of the display apparatus 100.

Figure 6B:
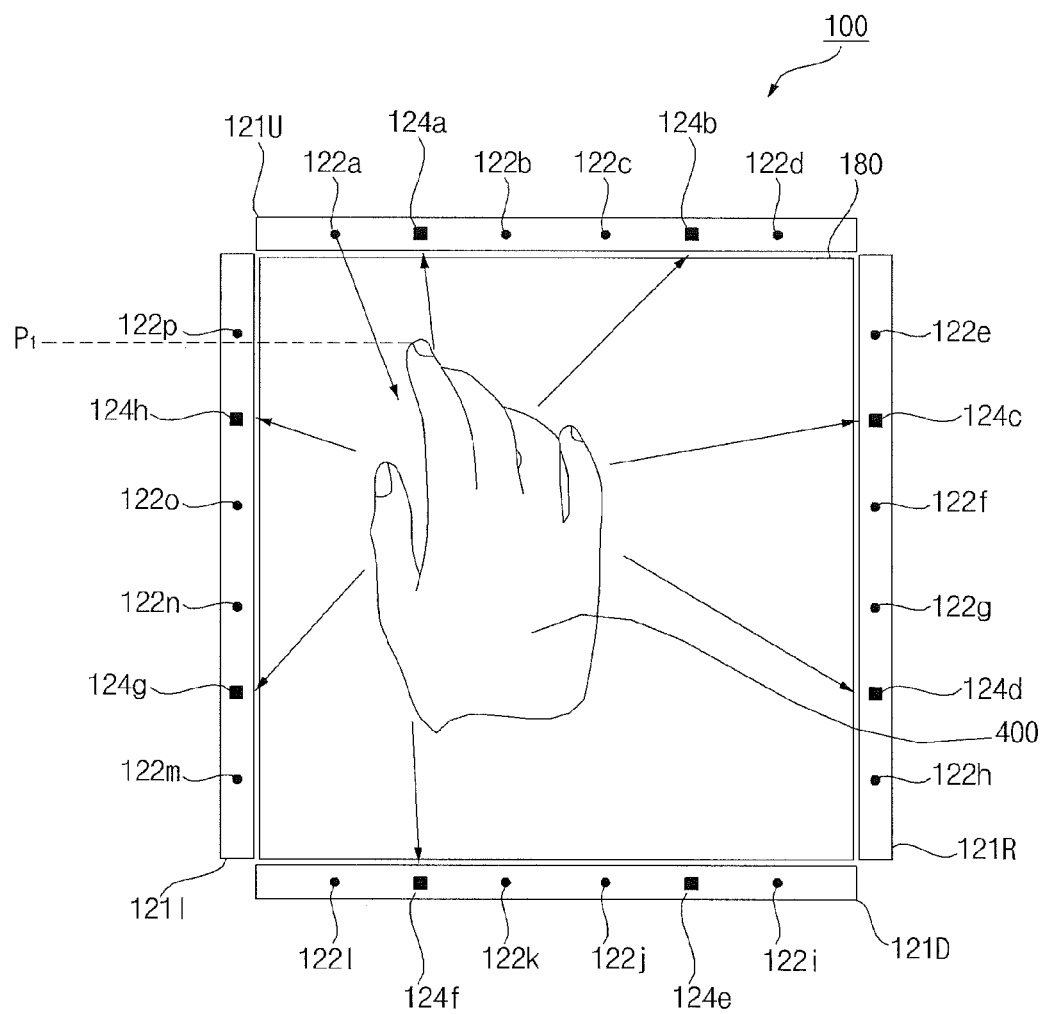

As shown in FIG. 6B, when the user's hand 400 is positioned at a first position $P_1$ which is between the first light emitting unit 122a and the second light emitting unit 122b, the light output from the first light emitting unit 122a is reflected and scattered and the light is received by the plurality of light receiving units 124a, . . . , 124h.

Figure 6C:
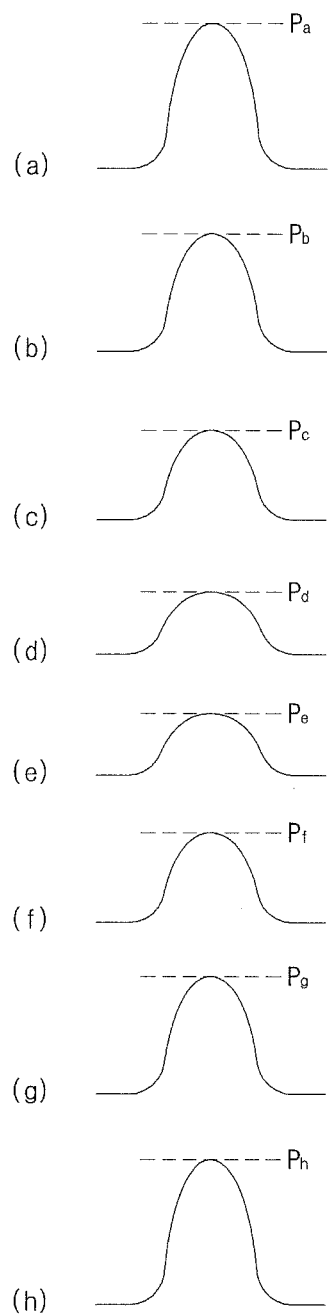

At this time, the waveforms of the light signals received by the plurality of light receiving units 124a, . . . , 124h are shown in FIG. 6C.

Referring to FIG. 6C, the levels $P_a$ and $P_h$ of the light signals received by the first light receiving unit 124a and the eighth light receiving unit 124h closest to the position of the first light emitting unit 122a and the user's hand 400 are largest, the levels $P_b$ and $P_g$ of the light signals received by the second light receiving unit 124b and the seventh light receiving unit 124g are secondly largest, the levels $P_c$ and $P_f$ of the light signals received by the third light receiving unit 124c and the sixth light receiving unit 124f are thirdly largest, and the levels $P_d$ and $P_e$ of the light signals received by the fourth light receiving unit 124d and the fifth light receiving unit 124e are smallest.

The processor 170 may calculate the first position P1 as the position of the external object, that is, the user's hand 400, when the light signal pattern of the received light shown in FIG. 6C appears, upon light emission of the first light emitting unit 122a.

Figure 6D:
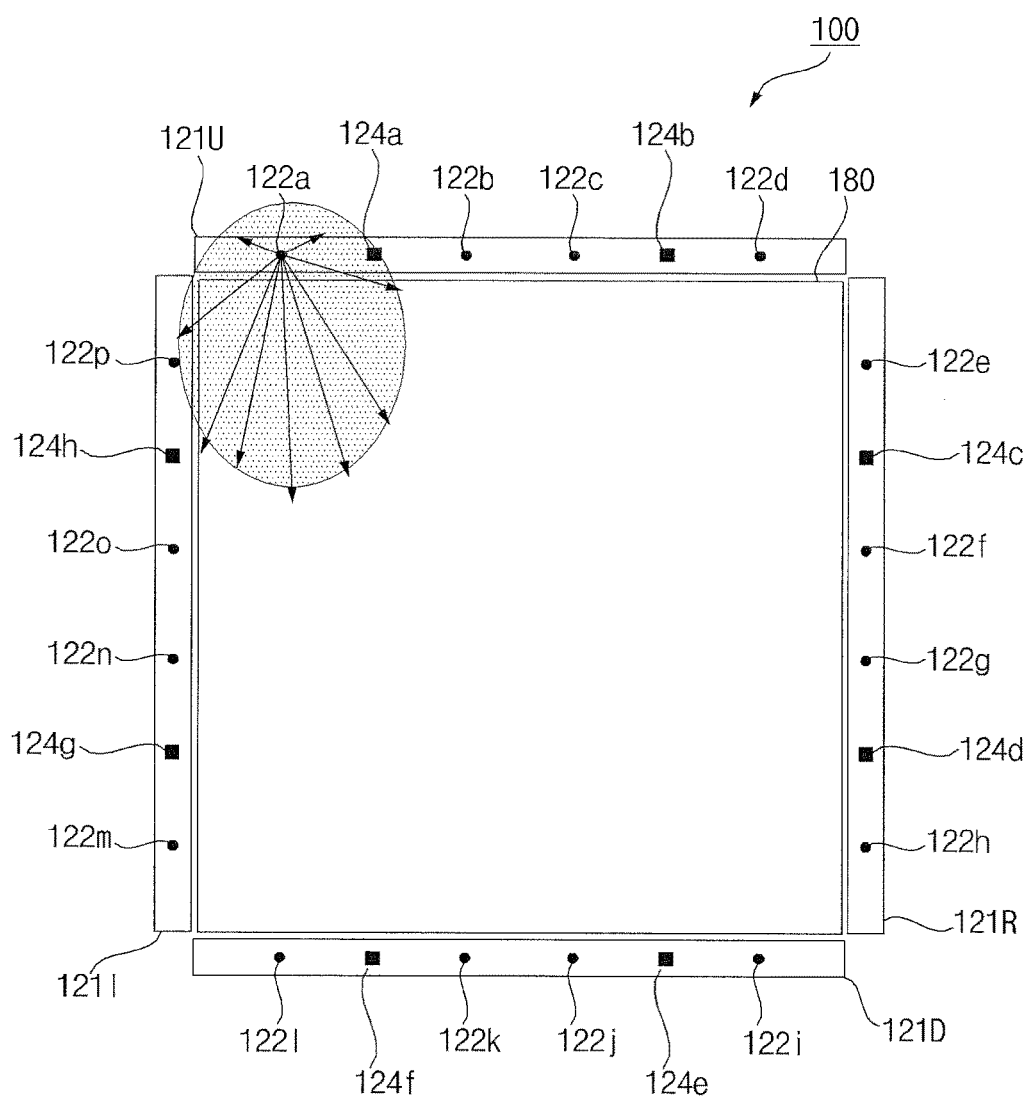

Next, FIG. 6D shows output light emitted from the first light emitting unit 122a of the display apparatus 100 as shown in FIG. 6A.

Figure 6E:
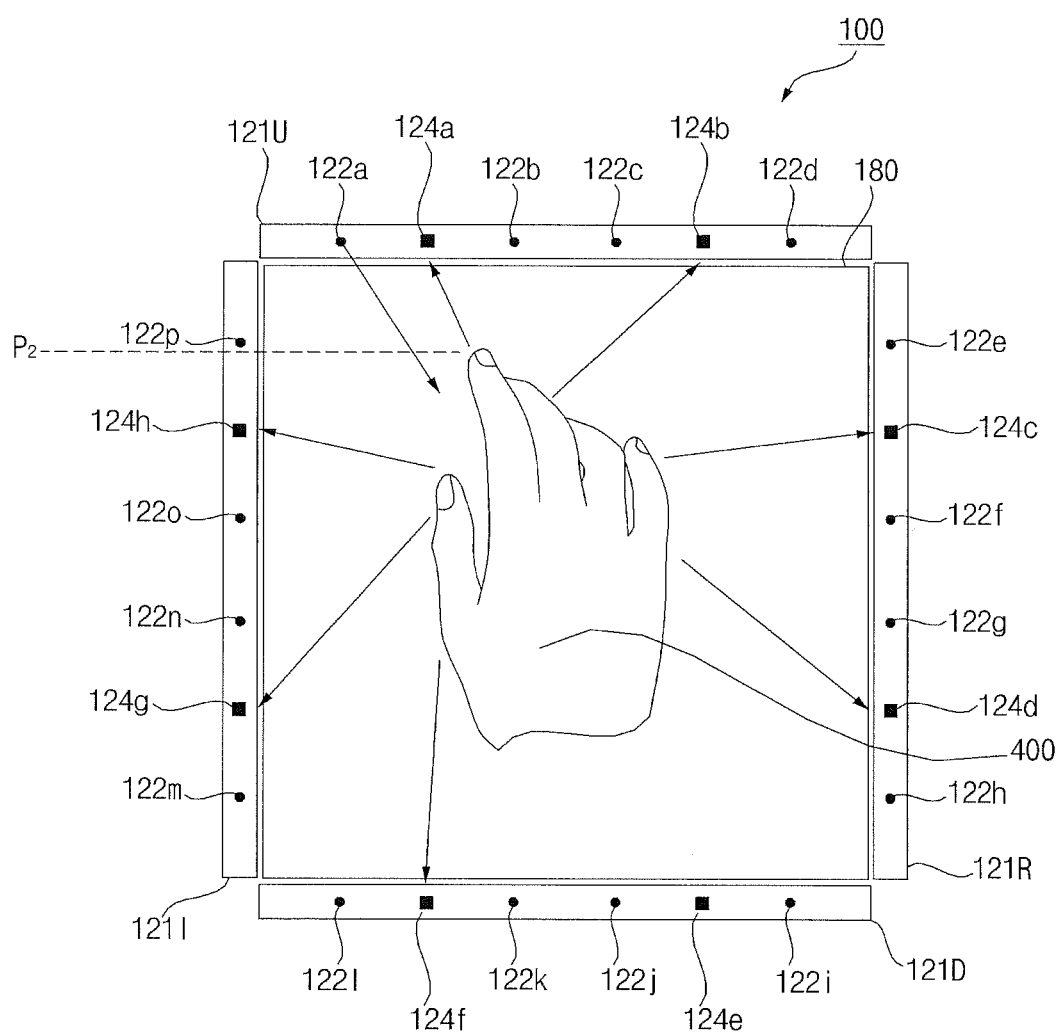

As shown in FIG. 6E, when the user's hand 400 is positioned at a second position $P_2$ between the second light emitting unit 122b and the third light emitting unit 122c, the output light emitted from the first light emitting unit 122a is reflected and scattered and the received light is received by the plurality of light receiving units 124a, ..., 124h.

Figure 6F:
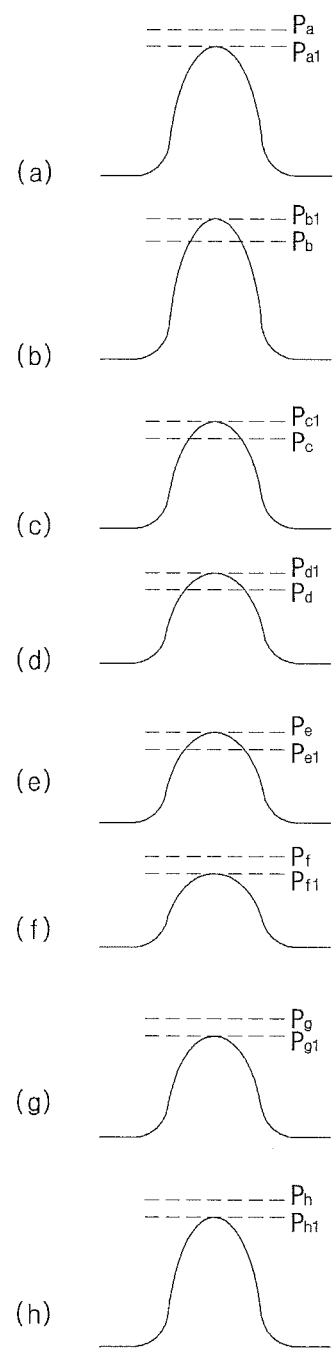

The waveforms of the light signals received by the plurality of light receiving units 124a, ..., 124h are shown in FIG. 6F.

Referring to FIG. 6F, the levels $P_{a1}$ and $P_{h1}$ of the light signals received by the first light receiving unit 124a and the eighth light receiving unit 124h closest to the position of the first light emitting unit 122a and the user's hand 400 are largest, the levels $P_{b1}$ and $P_{g1}$ of the light signals received by the second light receiving unit 124b and the seventh light receiving unit 124g are secondly largest, the levels $P_{e1}$ and $P_{f1}$ of the light signals received by the third light receiving unit 124c and the sixth light receiving unit 124f are thirdly largest, and the levels $P_{d1}$ and $P_{e1}$ of the light signals received by the fourth light receiving unit 124d and the fifth light receiving unit 124e are smallest.

The levels $P_{a1}$, $P_{b1}$, $P_{c1}$, $P_{d1}$, $P_{e1}$, $P_{f1}$, $P_{g1}$ and $P_{h1}$ of the light signals received by the light receiving units 124a, ..., 124h of FIG. 6F may be less than the levels $P_a$, $P_b$, $P_c$, $P_d$, $P_e$, $P_f$, $P_g$ and $P_h$ of the light signals received by the light receiving units 124a, ..., 124h of FIG. 6C.

The difference between the levels of the received light signals of FIGS. 6F and 6C is caused because the position $P_2$ of the hand is between the second light emitting unit 122b and the third light emitting unit 122c, which is far from the first light emitting unit 122a.

The processor 170 may calculate the second position $P_2$ as the position of the external object, that is, the user's hand 400, when the light signal pattern of the received light shown in FIG. 6F appears, upon light emission of the first light emitting unit 122a.

Figure 6G:
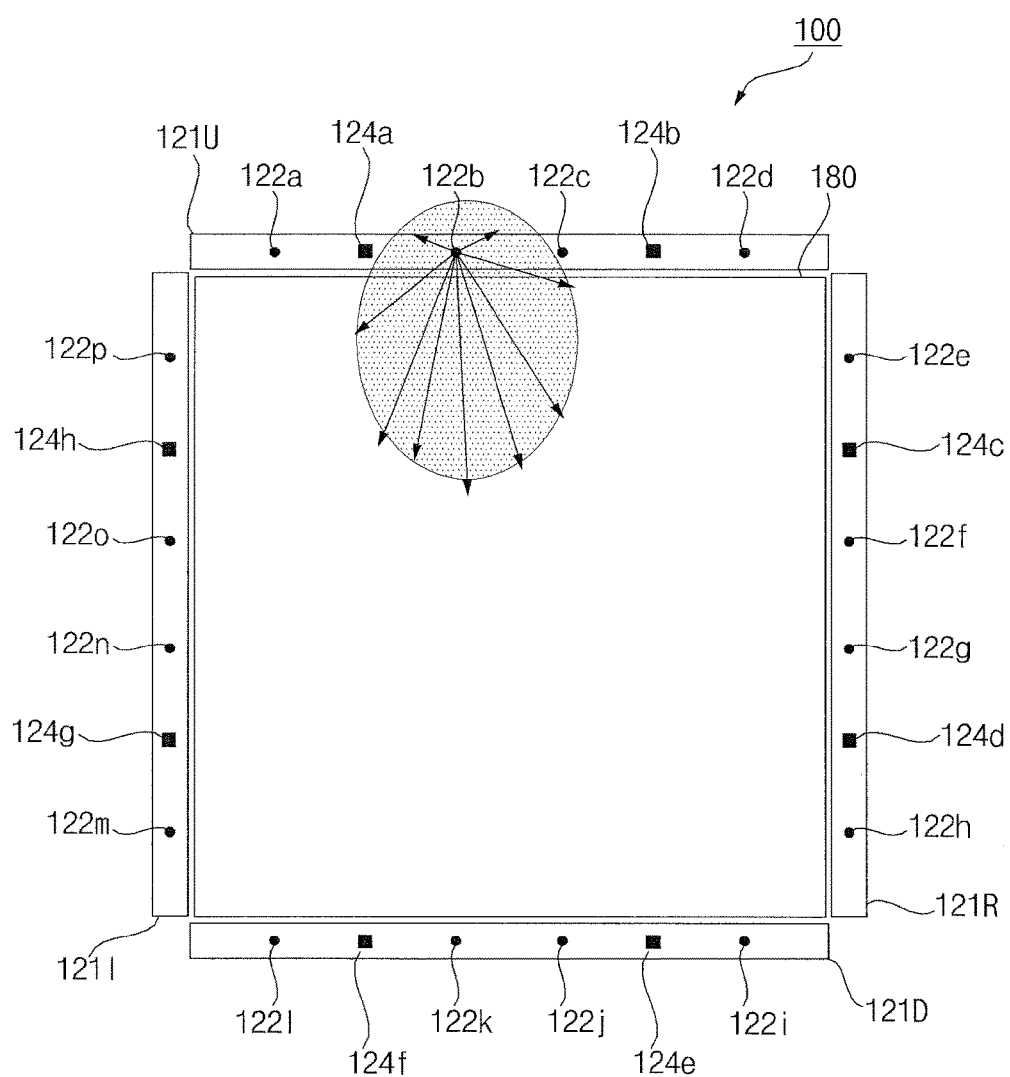

Next, FIG. 6G shows output light emitted from the second light emitting unit 122b of the display apparatus 100 as shown in FIG. 6A.

Figure 6H:
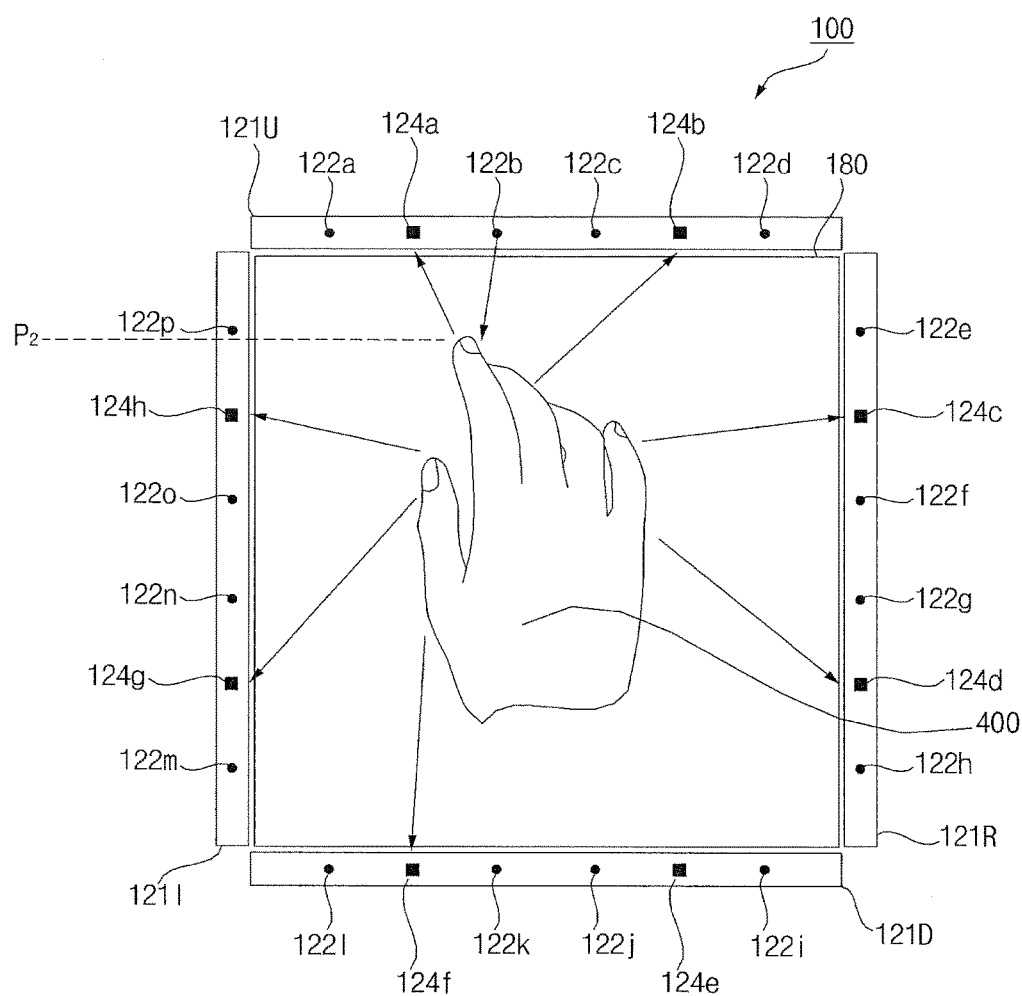

As shown in FIG. 6H, when the user's hand 400 is positioned at the second position $P_2$ between the second light emitting unit 122b and the third light emitting unit 122c, the output light emitted from the second light emitting unit 122b is reflected and scattered and the received light is received by the plurality of light receiving units 124a, ..., 124h.

Figure 6I:
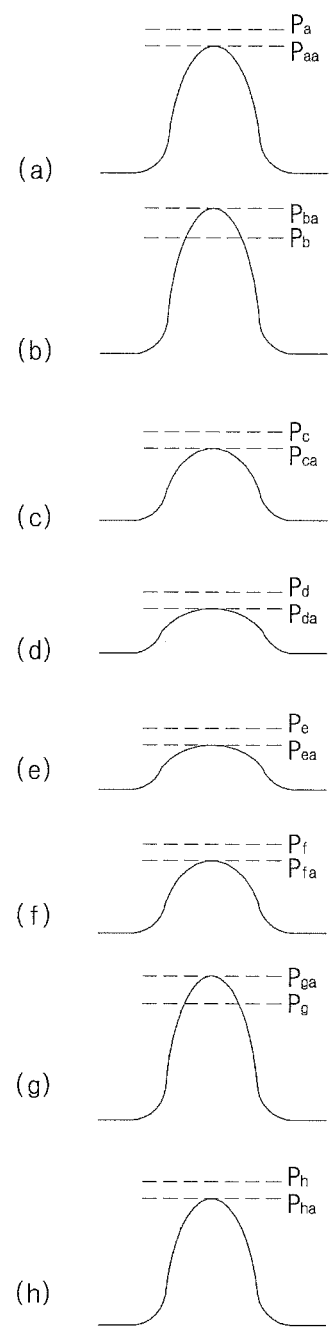

The waveforms of the light signals received by the plurality of light receiving units 124a, ..., 124h is shown in FIG. 6I.

Referring to FIG. 6I, the levels $P_{aa}$ and $P_{ha}$ of the light signals received by the first light receiving unit 124a and the eighth light receiving unit 124h closest to the position of the first light emitting unit 122a and the user's hand 400 are largest, the levels $P_{ba}$ and $P_{ga}$ of the light signals received by the second light receiving unit 124b and the seventh light receiving unit 124g are secondly largest, the levels $P_{ca}$ and $P_{fa}$ of the light signals received by the third light receiving unit 124c and the sixth light receiving unit 124f are thirdly largest, and the levels $P_{da}$ and $P_{ea}$ of the light signals received by the fourth light receiving unit 124d and the fifth light receiving unit 124e are smallest.

The levels $P_{aa}$, $P_{ca}$, $P_{da}$, $P_{ea}$, $P_{fa}$, and $P_{ha}$ among the levels $P_{aa}$, $P_{ba}$, $P_{ca}$, $P_{da}$, $P_{ea}$, $P_{fa}$, $P_{ga}$ and $P_{ha}$ of the light signals received by the light receiving units 124a, ..., 124h of FIG. 6I may be less than the levels $P_a$, $P_c$, $P_d$, $P_e$, $P_f$, and $P_h$ of the light signals received by the light receiving units 124a, ..., 124h of FIG. 6C.

The levels $P_{ba}$ and $P_{ga}$ of the light signals received by the second light receiving unit 124b and the seventh light receiving unit 124g are greater than the levels $P_b$ and $P_g$ of the light signals received by the second light receiving unit 124b and the seventh light receiving unit 124g of FIG. 6C.

The difference between the levels of the received light signals of FIGS. 6I and 6C is caused because the position $P_2$ of the hand is between the second light emitting unit 122b and the third light emitting unit 122c, which is far from the first light emitting unit 122a.

The processor 170 may calculate the second position $P_2$ as the position of the external object, that is, the user's hand 400, when the light signal pattern of the received light shown in FIG. 6I appears, upon light emission of the second light emitting unit 122b.

Figure 7A:
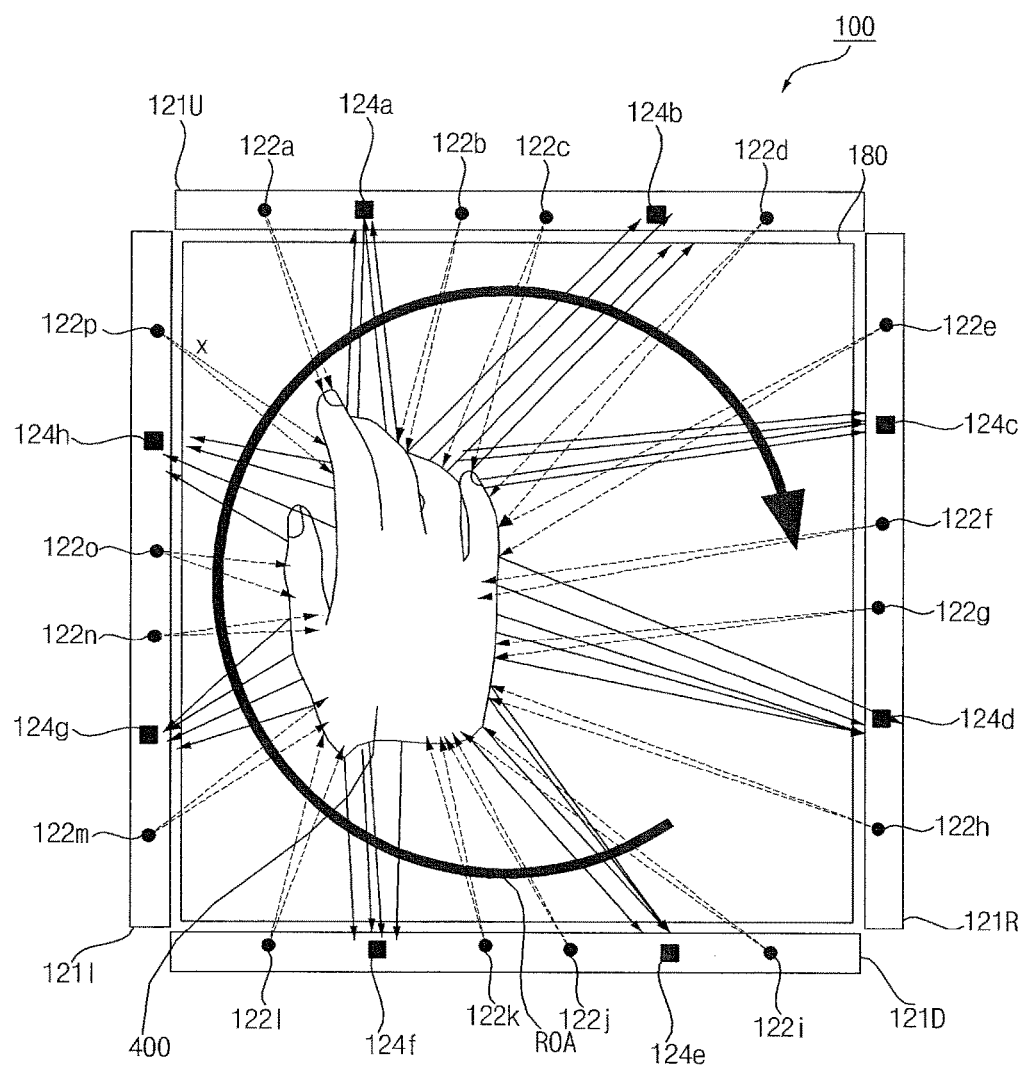

As a result, as shown in FIG. 7A, when the plurality of light emitting units 122a, ..., 122 sequentially emits light in the clockwise direction ROA, the plurality of light receiving units 124a, ..., 124h receives light in correspondence with sequential light emission.

The processor 170 may calculate the position of the external object based on the levels of the light signals received by the plurality of light receiving units 124a, ..., 124h in correspondence with sequential light emission of the plurality of light emitting units 122a, ..., 122p. In particular, the position of the user's hand 400 may be calculated.

As shown in FIG. 7B, the processor 170 may set the plurality of center points between the plurality of light emitting units 122a, ..., 122p and the plurality of light receiving units 124a, ..., 124h.

Since the output light emitted from the light emitting units is received by the light receiving units, the processor 170 may set the centers between the light emitting units and the light receiving units as the center points.

Part (b) of FIG. 7B shows the center of a virtual line 762 between the light emitting unit and the light receiving unit as the center point 764 and part (a) of FIG. 7B shows such center points labeled "x".

Figure 7C:
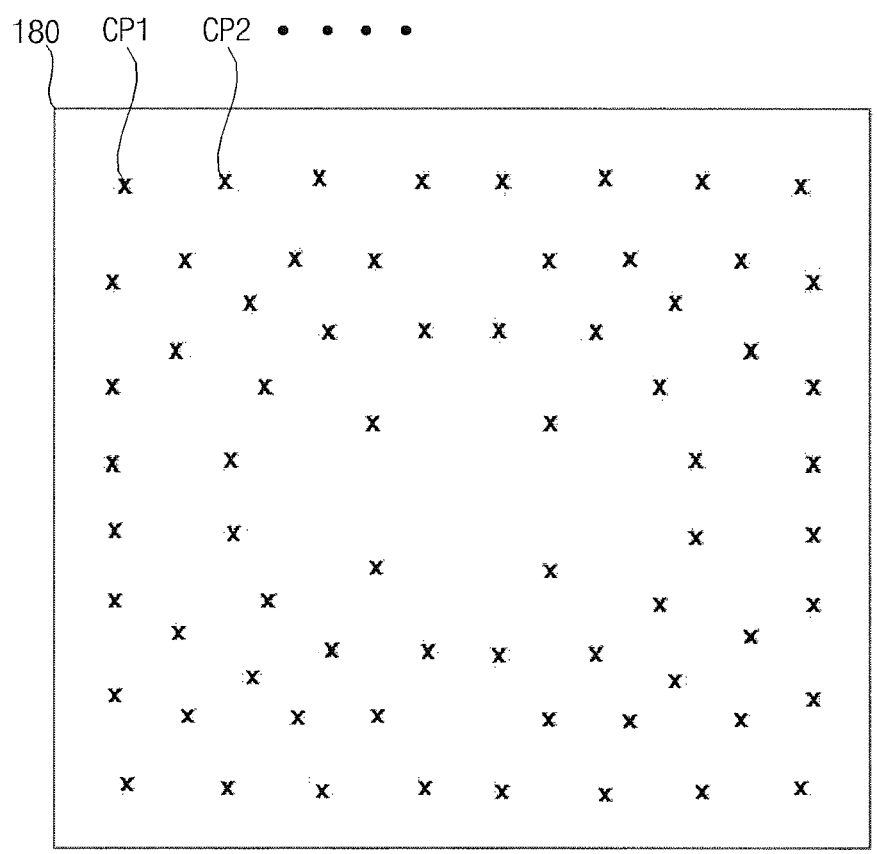

When the center points formed at the edges of the display among such center points are excluded, the plurality of center points Cp1, Cp2, ... shown in FIG. 7C may be set.

The memory 140 of the display apparatus 100 may store a light signal reception pattern corresponding to the plurality of center points Cp1, Cp2, ....

The processor 170 may compare the levels of the light signals received by the plurality of light receiving units 124a, ..., 124h in correspondence with the output light sequentially emitted from the plurality of light emitting units 122a, ..., 122p and the light signal reception pattern corresponding to the plurality of center points Cp1, Cp2, ... stored in the memory 140.

The processor 170 may select the light signal reception pattern corresponding to any one center point corresponding to the levels of the light signals received by the plurality of light receiving units 124a, ..., 124h.

The processor 170 may select any one of the plurality of center points based on the levels of the light signals received by the plurality of light receiving units 124a, ..., 124h and calculate the selected center point as the position of the external object. Therefore, it is possible to stably calculate the position of the external object.

The processor 170 may calculate the position of the external object and then calculate the distance value of the external object based on the level of the light signal.

In particular, when the user's hand is positioned between the first distance value L1 and the second distance value L2, it is possible to calculate the distance value of the user's hand.

For example, when the level of the received light signal is stored in the memory 140 according to a distance value between the first distance value L1 and the second distance value L2, the processor 170 performs matching with the level of the light signal corresponding to the distance value between the first distance value L1 and the second distance value L2 using the levels of the light signals received by the plurality of light receiving units 124a, . . . , 124h.

The processor 170 may output the distance value corresponding to the matched level of the light signal stored in the memory 140 as the distance value of the user's hand. Therefore, it is possible to calculate the distance value of the user's hand.

FIG. 8 is a view referred to for describing operation of the space sensor and the touch sensor of FIG. 4.

Referring to the figure, the user's hand 400 is positioned in front of the display apparatus 100 and is gradually approaching the display apparatus.

The display apparatus 100 according to the embodiment of the present invention may detect all paths, areas and positions of the hand (hand detection) until touch input is received when the user's hand sequentially approaches the display apparatus in a state of being positioned in front of the display apparatus and detect a finger (finger detection) as the user's hand approaches the display apparatus.

The display apparatus 100 includes the space sensor 121 and the touch sensor 126.

In the present specification, the path of the user's hand approaching the display apparatus 100 may be divided as shown in the figure.

That is, the path of the user's hand approaching the display apparatus may be divided into a first area Area1 410 between the first distance value L1 and the second distance value L2, a second area Area2 between the second distance value L2 and the third distance value L3 and a third area Area3 within the third distance value L3.

The first area Area1 is an output light distribution area in which the light output from the space sensor 121 is distributed. The first area Area1 is an area farthest from the display apparatus and may be called an emerging area.

The second area Area2 and the third area Area3 is an electric field distribution area in which an electric field generated by the touch sensor 126 is distributed by operation of the touch sensor 126.

In particular, the second area Area2 may be an area in which the touch sensor 126 operates in correspondence with the calculated distance value based on the light output from the space sensor 121 and the received light. Therefore, the second area may be called an approaching area.

The second area Area2 and the third area Area3 are electric field distribution areas, in which floating touch is possible, but are different from each other in the size of the touch sensing cell.

That is, the size of the touch sensing cell of the third area Area3 may be less than that of the second area Area2. Therefore, it is possible to more finely detect the position information of the user's hand.

As a result, in the third area Area3, the user's hand may be pinpointed or targeted. Accordingly, the third area Area3 may be called a targeting area.

Even in the second area Area2, the light output from the space sensor 121 may be distributed. Accordingly, the second area Area2 may be an overlapping area in which the electric field generated by the touch sensor 126 and the output light overlap.

As a result, the display apparatus may detect hand motion of the user within the first area Area1 via the space sensor and detect the user's hand within the second area Area2 and the third area Area3 via the touch sensor.

In the figure, a distribution map 510 of the output light in the first area Area1 and the second area Area2 is shown. In particular, in the figure, the intensity of the output light in the periphery of the display apparatus 100 is higher, but the output light is uniformly distributed in the entire area of the front portion of the display apparatus 100.

In the figure, an electric field distribution map 520 in the second area Area1 and the third area Area3 is shown. As described above, as the electrical signal is supplied to the electrode array in the touch sensor 126, the electric field is distributed in the entire area of the front portion of the display apparatus 100.

In the display apparatus 100 according to the embodiment of the present invention, by a combination of the space sensor 121 based on the infrared light and the touch sensor 126 for detecting floating touch input, a blind spot does not occur upon recognizing the user's hand positioned in front of the display apparatus 100. In addition, x-, y- and z-axis information of the user's hand may be acquired. In addition, the detection speed of the user's hand is high and the present invention is applicable to a large display apparatus 100. Since the touch sensor 126 selectively operates, it is possible to reduce power consumption.

Figure 9A:
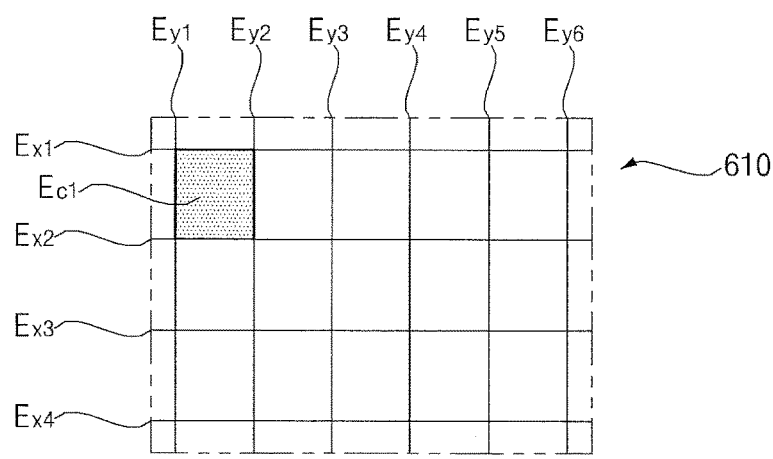
FIGS. 9A to 9C are views referred to for describing operation of the touch sensor of FIG. 4.
Figure 9B:
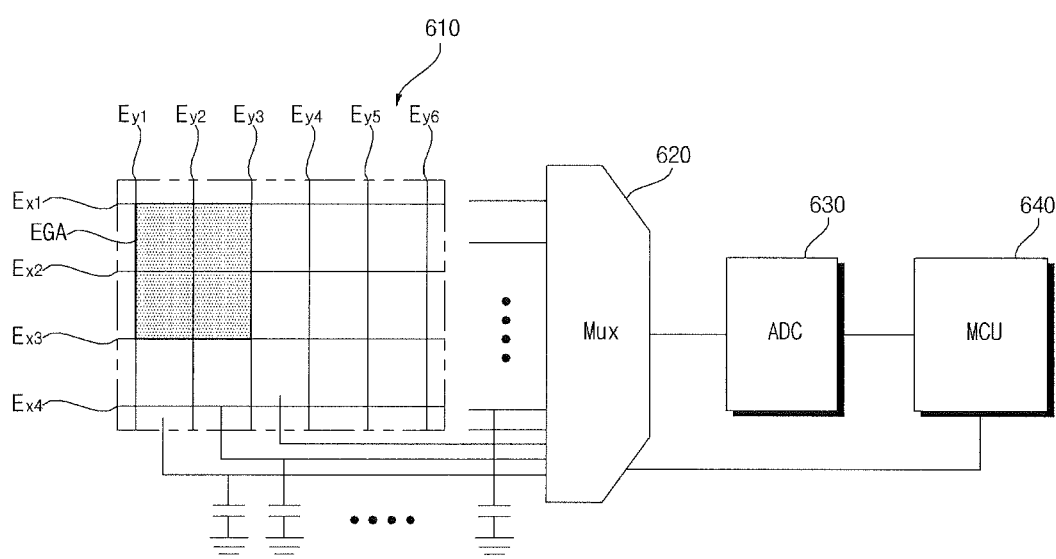
Figure 9C:
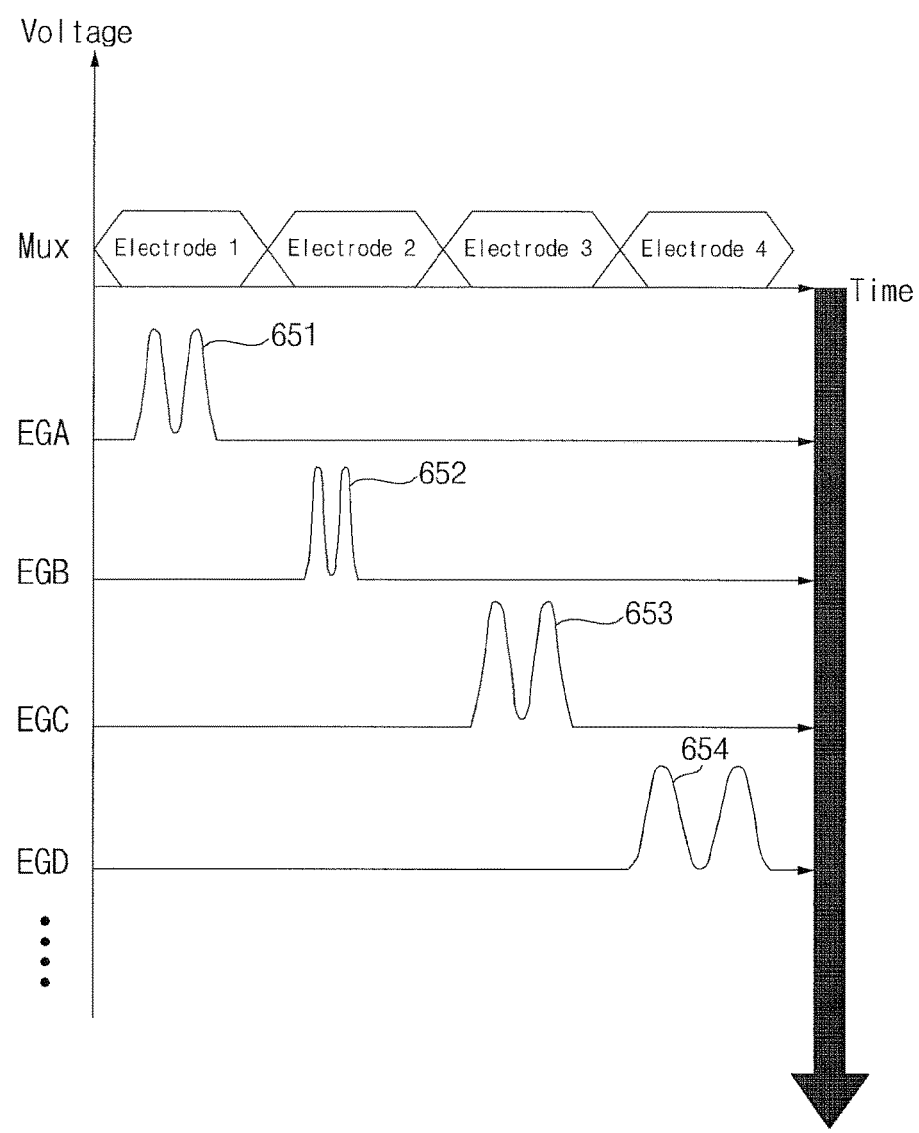

FIGS. 9A to 9C are views referred to for describing operation of the touch sensor of FIG. 4.

First, FIG. 9A shows a part of the electrode array 610 in the touch sensor 126.

The electrode array 610 may include horizontal electrodes Ex1, Ex2, Ex3 and Ex4 and vertical electrodes Ey1, Ey2, Ey3, Ey4, Ey5 and Ey6.

The processor 170 may change grouping of the electrode array in the touch sensor 126 based on approximate z-axis information calculated based on the light received by the space sensor 121.

For example, when the distance value of the user's hand is within the third distance value L2, that is, in the third area A3, the size of the touch sensing cell (grouped electrodes) may correspond to the size of one electrode cell Ec1 as shown in the figure.

As another example, if the distance value of the user's hand is between the second distance value L2 and the third distance value L3, that is, in the second area A2, the size of the touch sensing cell (grouped electrodes) may correspond to the size of four electrode cells (electrode group A) as shown in FIG. 9B.

FIG. 9B shows a part of the electrode array 610 in the touch sensor 126. In particular, capacitance change is sensed in correspondence with four electrode cells (electrode group A). Capacitance change signals sensed at the plurality of electrode cells are multiplexed in a MUX 620, are converted into digital signals by an analog-to-digital converter (ADC) 630, and are processed by a micro controller unit (MCU) 640.

The MCU 640 may calculate x-, y- and z-axis information of floating touch input based on the converted digital signals.

As shown in FIG. 9B, when the size of the touch sensing cell (grouped electrodes) corresponds to the size of four electrode cells, the MCU 640 may apply the electrical signal to the first horizontal electrode Ex1 and the third horizontal electrode Ex3 among the plurality of horizontal electrodes Ex1, Ex2, Ex3 and Ex4 and apply the electrical signal to the first, third and fifth vertical electrodes Ey1, Ey3 and Ey5 among the plurality of vertical electrodes Ey1, Ey2, Ey3, Ey4, Ey5 and Ey6. Accordingly, the size of the touch sensing cell (grouped electrodes) may be set to correspond to the size of four electrode cells.

The MCU 640 may be included in the processor 170.

The size of the touch sensing cell (grouped electrodes) may be variously set to 1×1, 2×2, 3×3 or 2×7 in correspondence with the position of the user's hand or finger.

Next, FIG. 9C shows capacitance change sensed at the electrode array 610 of the touch sensor 126.

In the figure, the capacitance change signals 651, 652, 653 and 654 sensed at the plurality of electrode groups A, B, C and D are time-divisionally sensed. The mux 620 may multiplex the signals 651, 652, 653 and 654 and output the multiplexed analog signal.

The vehicle display apparatus 100 according to one embodiment of the present invention can provide various user interfaces according to trajectory tracking of a hand.

The processor 170 of the display apparatus 100 may detect the hand via the space sensor 121.

The light output unit 122 of the space sensor 121 and, more particularly, the plurality of light emitting units 122a, . . . , 122p may sequentially output light and the light reception unit 124 and, more particularly, the plurality of light receiving units 124a, . . . , 124h may sequentially receive light.

For example, when the user's hand 400 is positioned within the first distance value L1 from the display 180, since the output light is scattered or reflected from the user's hand, the light reception unit 124 receives light scattered or reflected from the user's hand.

The processor 170 may calculate the position information of the user's hand based on a difference between the electrical signal of the output light and the electrical signal of the received light.

The processor 170 of the display apparatus 100 may track the trajectory of the user's hand.

After the user's hand 400 is detected via the space sensor 121, the processor 170 may track motion of the user's hand 400 based on the difference between the electrical signal of the output light and the electrical signal of the received light. That is, the motion trajectory of the user's hand 400 may be detected.

The processor 170 of the display apparatus 100 may control corresponding operation if the trajectory of the hand is a circular trajectory.

For example, the processor 170 may control display of a magnifier object for zooming in or out a map image on the display 180, when input corresponding to a first-direction circular trajectory is received in a state of displaying the map image on the display 180.

As another example, the processor 170 may control display of a second menu screen or a pre-set application execution screen when input corresponding to the first-direction circular trajectory is received in a state of displaying a first menu screen on the display 180.

The processor 170 may control end of the zoom mode, when the motion trajectory of the user's hand corresponds to a second-direction circular trajectory different from the first-direction circular trajectory, after entering the zoom mode.

The processor 170 may control display of the first menu screen when the trajectory of the user's hand corresponds to the second-direction circular trajectory different from the first-direction circular trajectory in a state of displaying the second menu screen or the pre-set application execution screen.

The processor 170 of the display apparatus 100 may detect the trajectory of the user's hand via the space sensor 121 when the user's hand is positioned between the first distance value L1 and the second distance value L2 from the display 180 and detect the trajectory of the user's hand 400 via the touch sensor 126 when the user's hand is positioned within the third distance value L3 from the display 180.

The processor 170 of the display apparatus 100 may detect the trajectory of the user's hand 400 via the space sensor 121 and the touch sensor 126 when the user's hand 400 is positioned at the second distance value L2 and the third distance value L3.

FIGS. 10A to 17 are views referred to for describing operation of providing various user interfaces according to trajectory tracking of a hand in a display apparatus.

Figure 10A:
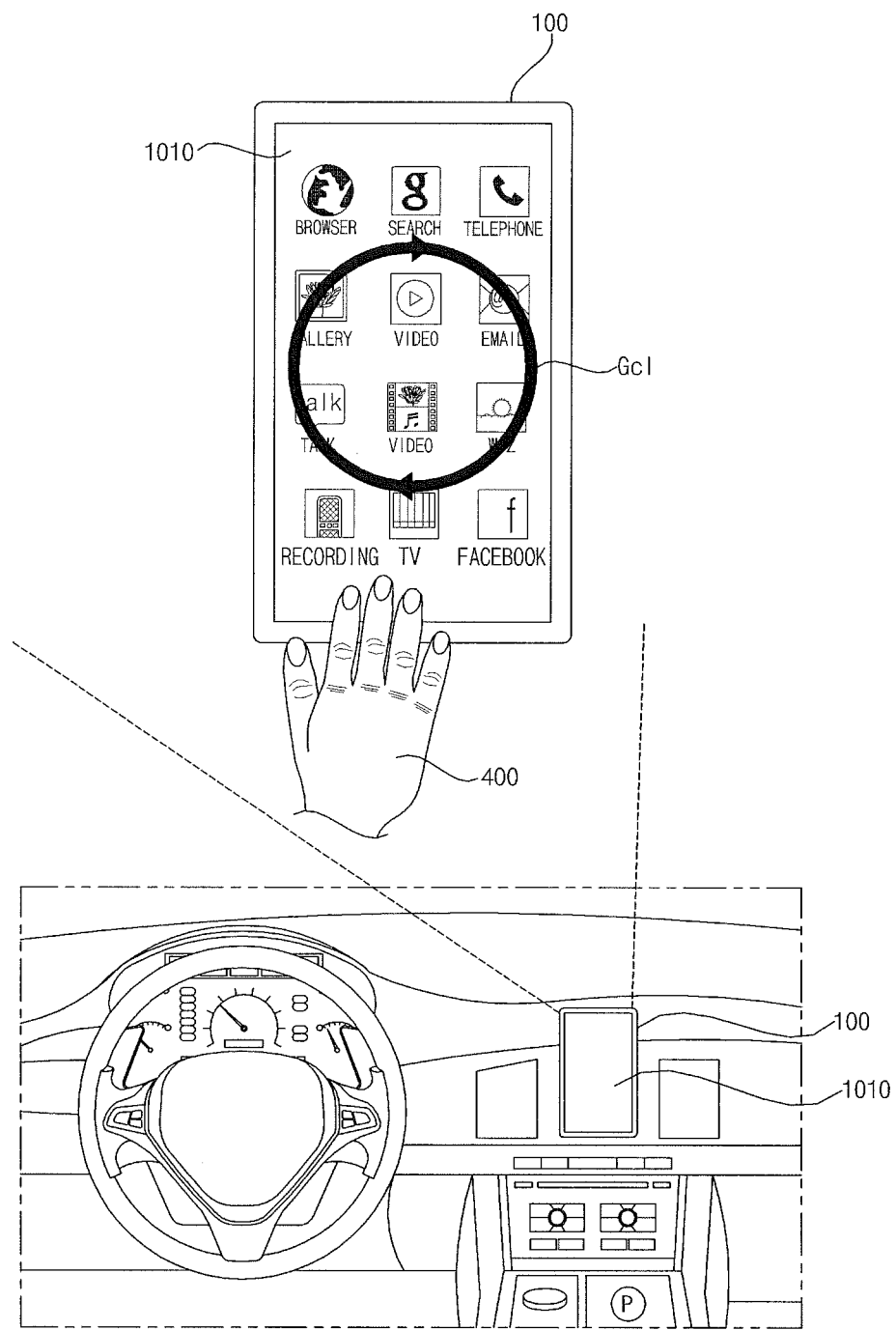

FIG. 10A shows a first menu screen 1010 on a display apparatus 100 including various application items, which is displayed on the vehicle display apparatus 100 mounted in the vehicle.

When clockwise circular trajectory input Gc1 using the user's hand 400 is received in a state of displaying the first menu screen 1010, the processor 170 recognizes the clockwise circular trajectory input Gc1 based on the signal sensed via the space sensor 121 or the touch sensor 126.

Figure 10B:
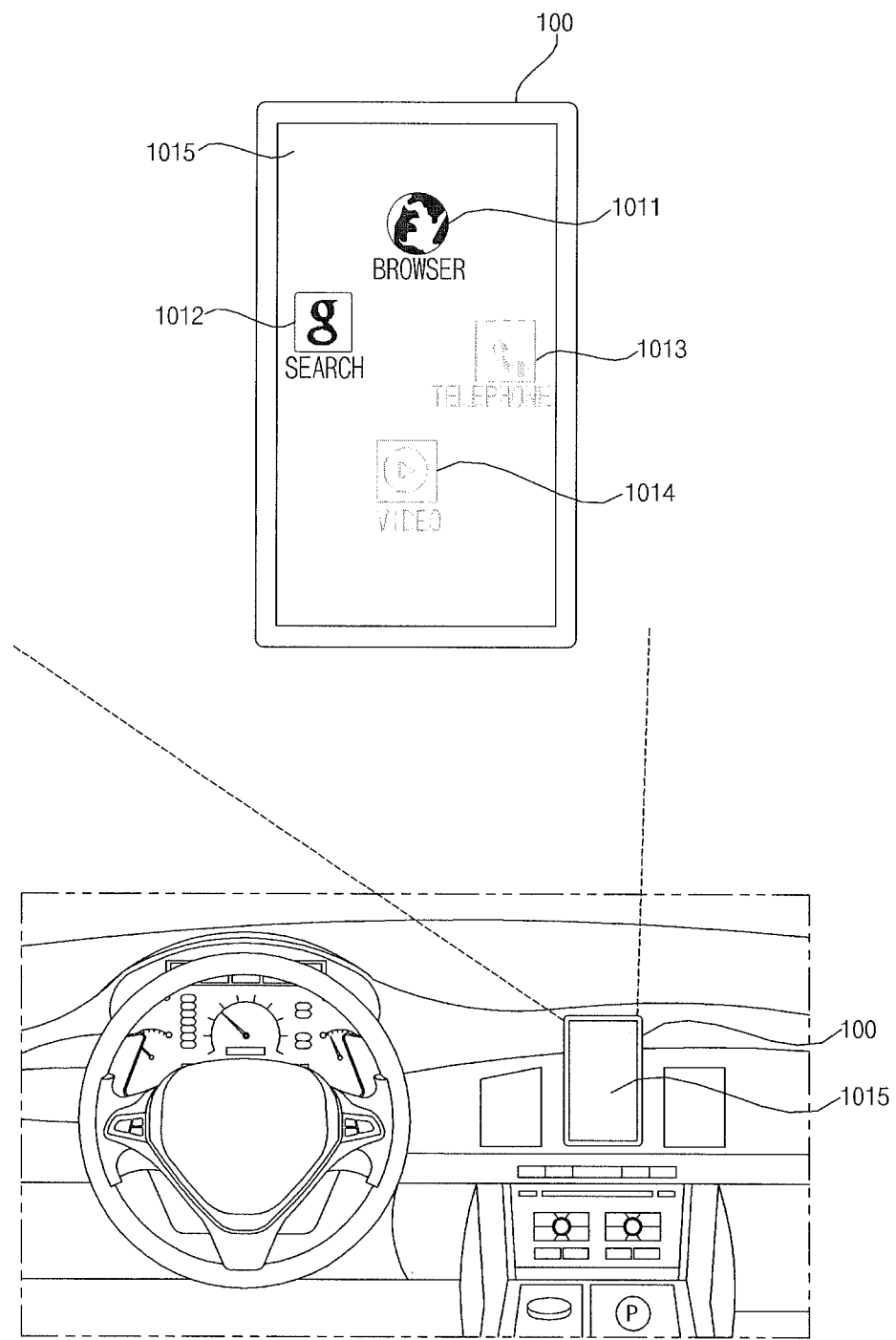

The processor 170 may control display of a second menu screen 1015 as shown in FIG. 10B.

For example, when operation corresponding to the clockwise circular trajectory input Gc1 is previously set in the display apparatus 100, as shown in the figure, the second menu screen 1015 may be displayed.

As another example, the processor 170 may control automatic display of the second menu screen 1015 including application items frequently used by the user, even when operation corresponding to the clockwise circular trajectory input is not pre-set.

On the second menu screen 1015, some applications such as a browser application 1011 and a search application 1012 are activated and the other applications such as a telephone application 1013 and a video application 1014 are deactivated.

As shown in the figure, the most frequently used browser application 1011 may be displayed at an uppermost side of the display. Therefore, the user can immediately find the frequently used application item, while driving the vehicle.

When the clockwise circular trajectory input Gc1 using the user's hand 400 is received in a state of displaying the second menu screen 1015, the processor 170 may recognize the clockwise circular trajectory input Gc1 and control display of a third menu screen 1018 as shown in FIG. 10C.

On the third menu screen 1018, the application items 1011, 1012, 1013 and 1014 are rotated as compared to the second menu screen 1015 and some application items 1013 and 1014 are activated. Therefore, the user can immediately find a desired application item, while driving the vehicle.

Figure 10D:
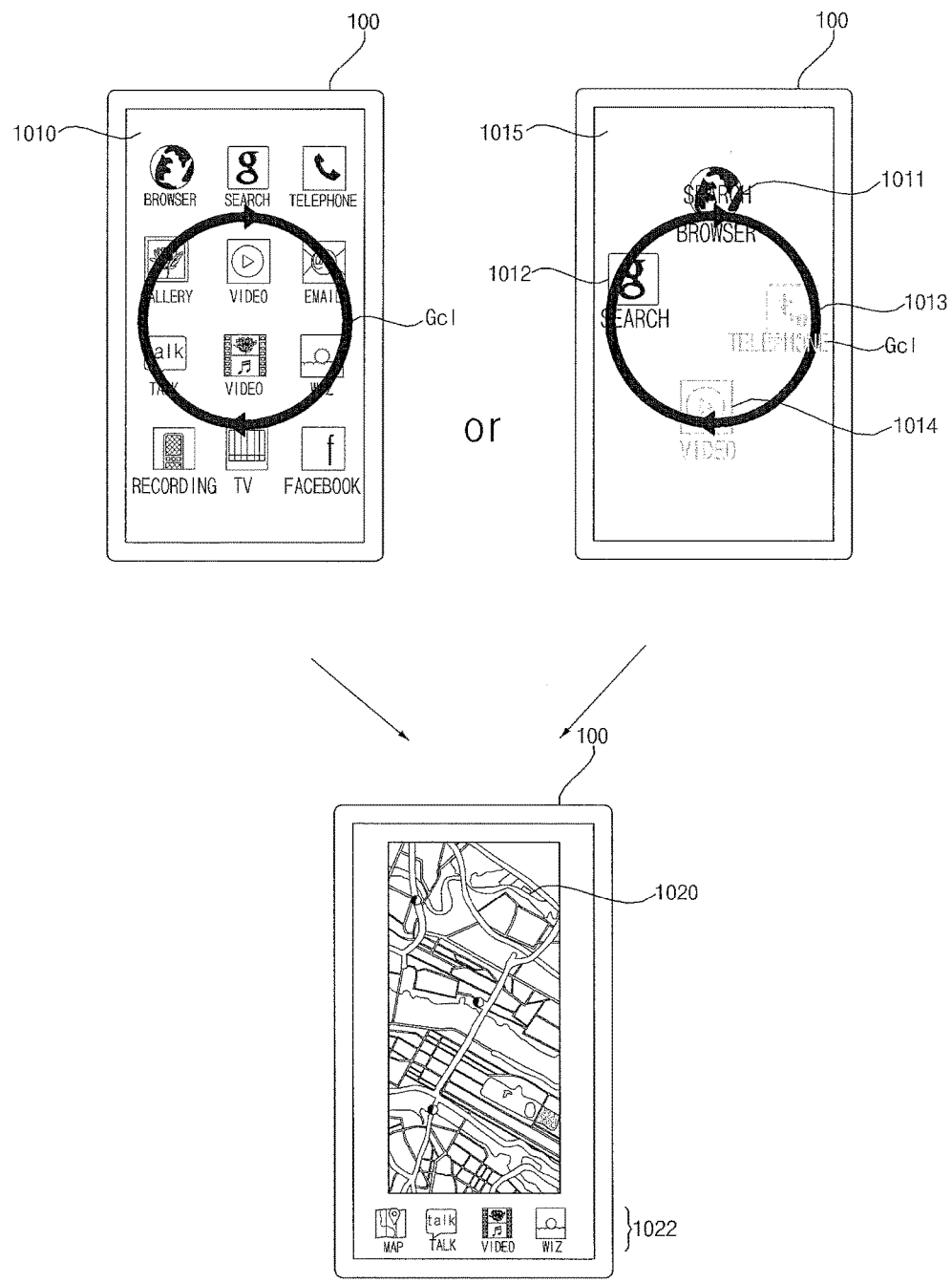

FIG. 10D shows display of a map image 1020 on the display apparatus 100 when the clockwise circular trajectory input Gc1 using the user's hand 400 is received in a state of displaying the first menu screen 1010 or the second menu screen 1015.

Therefore, the user can easily confirm the map image via the clockwise circular trajectory input Gc1.

Various application items 1022 may be displayed below the map image 1020.

The processor 170 may control entrance into the zoom mode for zooming in or out at least a part of the image displayed on the display 180, when the clockwise circular trajectory input Gc1 is received.

That is, as shown in part (a) of FIG. 11, the processor 170 may control entrance into the zoom mode for zooming in or out the map image 1030 when the clockwise circular trajectory input Gc1 is received in a state of displaying the map image 1030 on the display 180.

In part (a) of FIG. 11, vehicle direction guide information 1037, vehicle speed limit information 1035 and various menus 1032 are further displayed on the display apparatus 100 in addition to the map image 1030.

More specifically, the processor 170 may enter the zoom mode when the clockwise circular trajectory input Gc1 is received in a state of displaying the map image on the display 180 and control display of the magnifier object 1040 for zooming in or out a part of the map image 1031 on the display 180, as shown in part (b) of FIG. 11.

At this time, when the distance of the user's hand 400 is d1, an image 1042 in the magnifier object 1040 may be displayed without being zoomed in or out.

In the zoom mode, that is, in a state of displaying the magnifier object 1040, if the distance of the user's hand 400 is d2 which is less than d1, as shown in part (c) of FIG. 11, the image 1043 in the magnifier object 1040 is zoomed in and enlarged. Therefore, the user can easily view a desired area in detail.

That is, the processor 170 may control zoom-in of at least a part of the image displayed on the display 180 when the user's hand approaches the display 180 and zoom-out of at least a part of the image displayed on the display 180 when the user's hand moves away from the display 180, after entering the zoom mode.

FIG. 12 shows the case in which the clockwise circular trajectory input Gc1 is received in a state of displaying the first menu screen.

Part (a) of FIG. 12 shows the case in which the clockwise circular trajectory input Gc1 is received in a state of displaying the first menu screen 1010.

In this case, as shown in part (b) of FIG. 12, the processor 170 may control display of a pre-set application execution screen 1210. In the figure, a music play application execution screen 1210 is shown. Therefore, the user can immediately execute a desired application, while driving the vehicle.

When the counterclockwise circular trajectory input Gcc1 is received in a state of displaying the pre-set application execution screen 1210, as shown in part (c) of FIG. 12, the processor 170 may control display of the first menu screen 1010.

That is, the processor 170 may end display of the pre-set application execution screen 1210 and control display of a previous screen, when the counterclockwise circular trajectory input Gcc1 is received. Therefore, the user can easily return to the previous screen while driving the vehicle.

Figure 13:
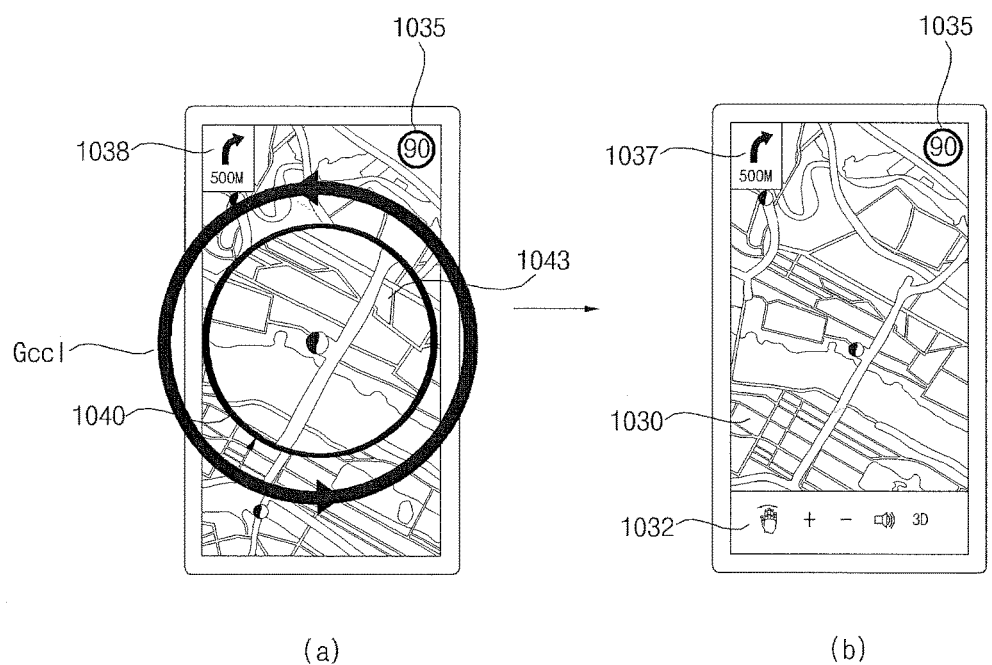

Part (a) of FIG. 13 shows the case in which the counterclockwise circular trajectory input Gcc1 is received in a state of displaying the map image 1031 and the magnifier object 1040 for zooming in or out a part of the map image 1031 as shown in part (b) of FIG. 11.

Therefore, the processor 170 may end the zoom mode and control display of a previous screen.

That is, as shown in part (b) of FIG. 13, the map image 1030 may be displayed on the display apparatus 100 in a state in which the magnifier object 1040 disappears. Therefore, the user can easily return to the previous screen while driving the vehicle.

The processor 170 may control display of the settings screen for controlling at least one of in-vehicle air conditioner settings, lamp settings, volume settings, window settings and sunroof settings, when the clockwise circular trajectory input Gc1 is continuously received in a state of displaying the map image on the display 180.

Figure 14:
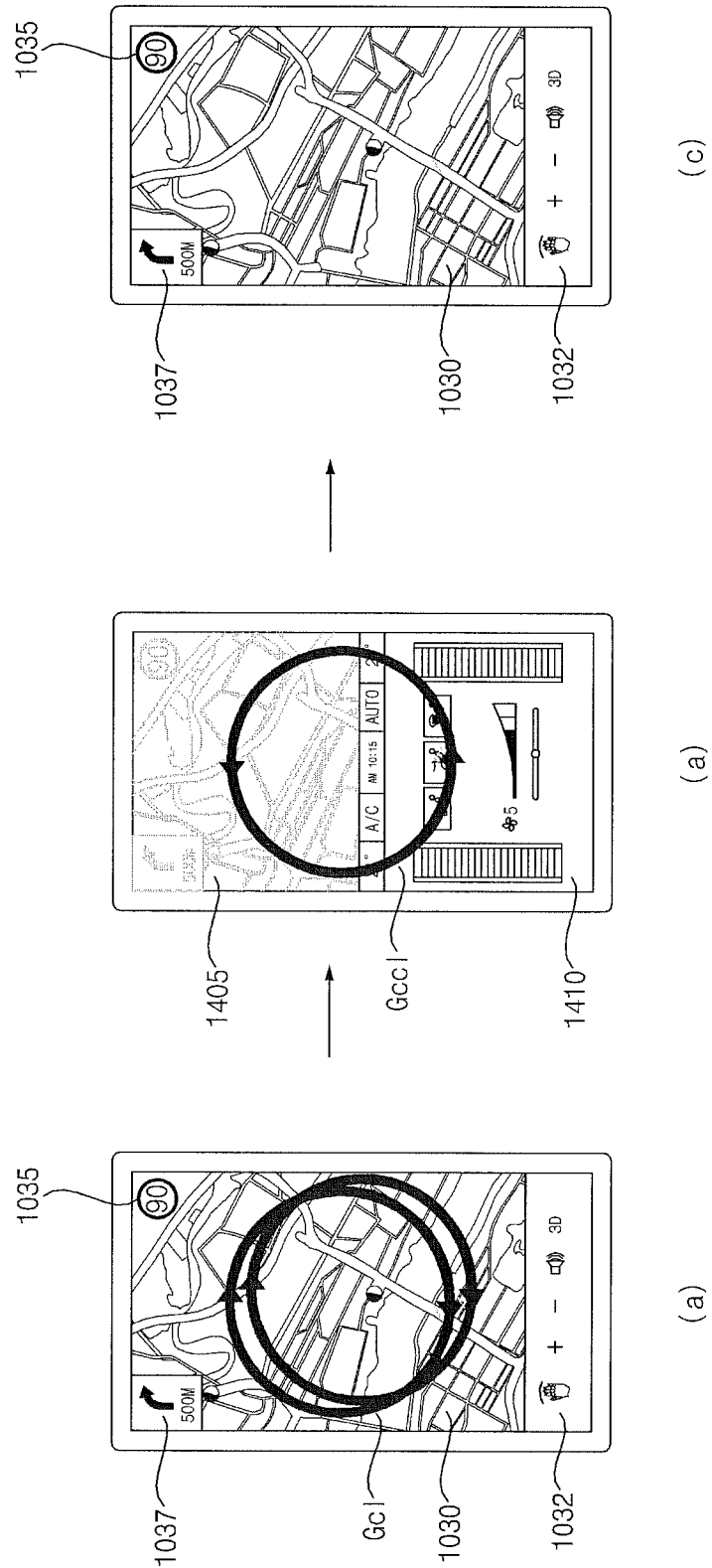

Part (a) of FIG. 14 shows the case in which the clockwise circular trajectory input Gc1 is continuously received twice while displaying the map image 1030.

As shown in part (b) of FIG. 14, the map image 1045 may be deactivated and the in-vehicle air conditioner settings screen 1410 may be displayed. Therefore, the user can easily set the internal temperature of the vehicle and easily perform fan control.

When the counterclockwise circular trajectory input Gcc1 is received in a state of displaying the in-vehicle air conditioner settings screen 1410 of part (b) of FIG. 14, as shown in part (c) of FIG. 14, the map image 1030 which is the previous screen may be displayed on the display apparatus 100.

The display apparatus may enter the zoom mode by selecting a separate menu item in addition to the clockwise circular trajectory input Gc1.

Figure 15:
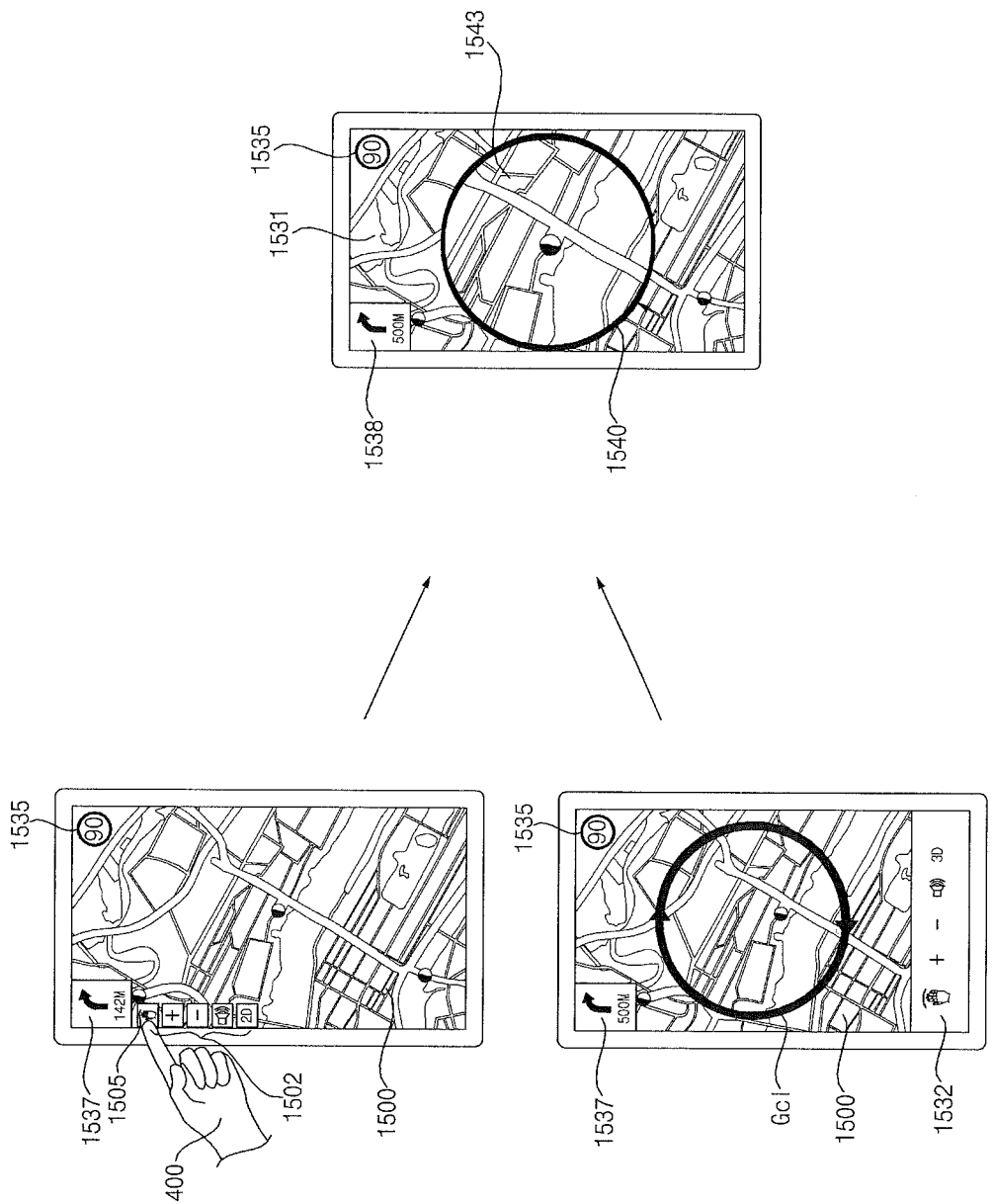

FIG. 15 shows the case in which, when user touch input for selecting an object indicating the zoom mode is received or clockwise circular trajectory input Gc1 is received in a state of displaying the map image 1500, the display apparatus 100 enters the zoom mode and displays the map image 1531 and the magnifier object 1540 including a zoom-in image displayed therein.

The processor 170 may control zoom-in of at least a part of the image displayed on the display 180 when the user's hand approaches the display 180 and zoom-out of at least a part of the image displayed on the display 180 when the user's hand moves away from the display 180, after entering the zoom mode.

Figure 16:
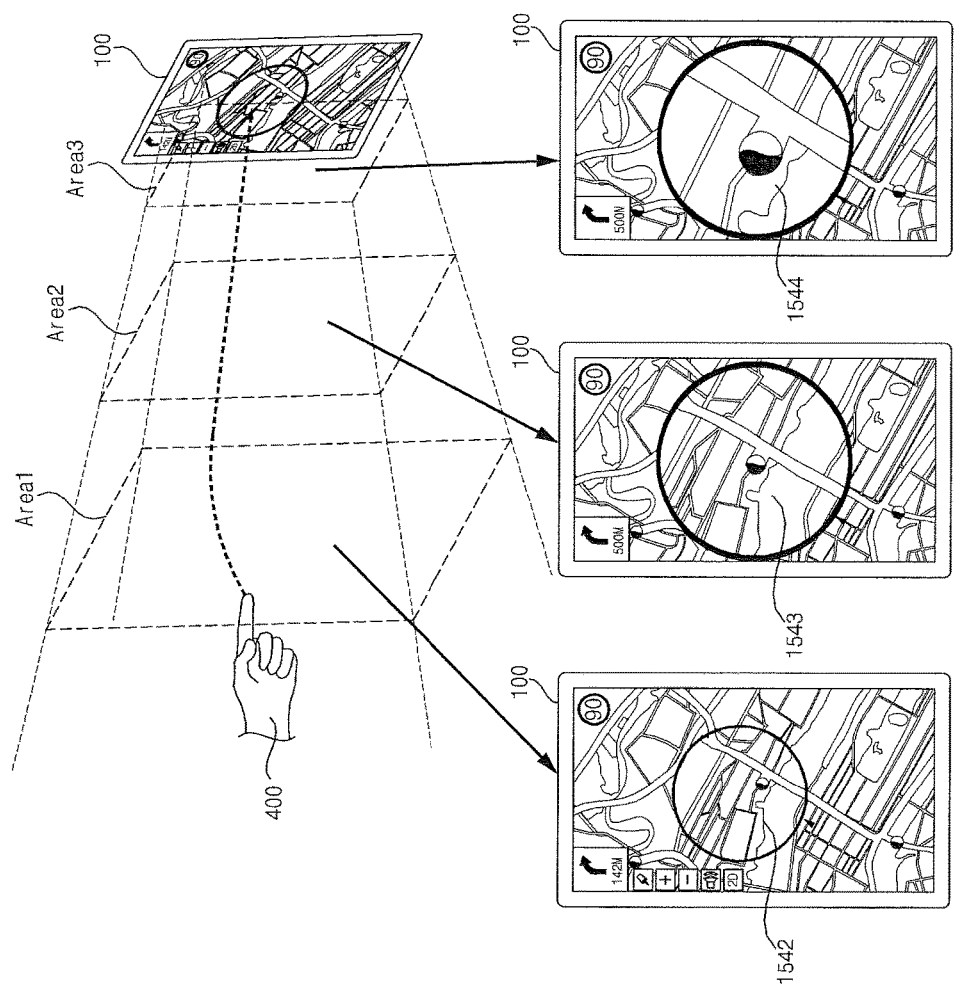

FIG. 16 shows zoom-in/zoom-out of the map image when the user's hand 400 is positioned in the first area A1, the second area A2 and the third area A3 respectively corresponding to the first distance value L1, the second distance value L2 and the third distance value L3 in a state in which the zoom mode is activated in the display apparatus 100.

The magnification of the image 1542 in the magnifier object 1540 is lowest if the user's hand 400 is in the first area A1 farthest from the display apparatus 100 and is highest (zoom-in) when the user's hand 400 is in the third area A3 closest to the display apparatus 100. Therefore, the user can easily confirm zoom-in/zoom-out of the part of the map image while driving the vehicle.

Figure 17:
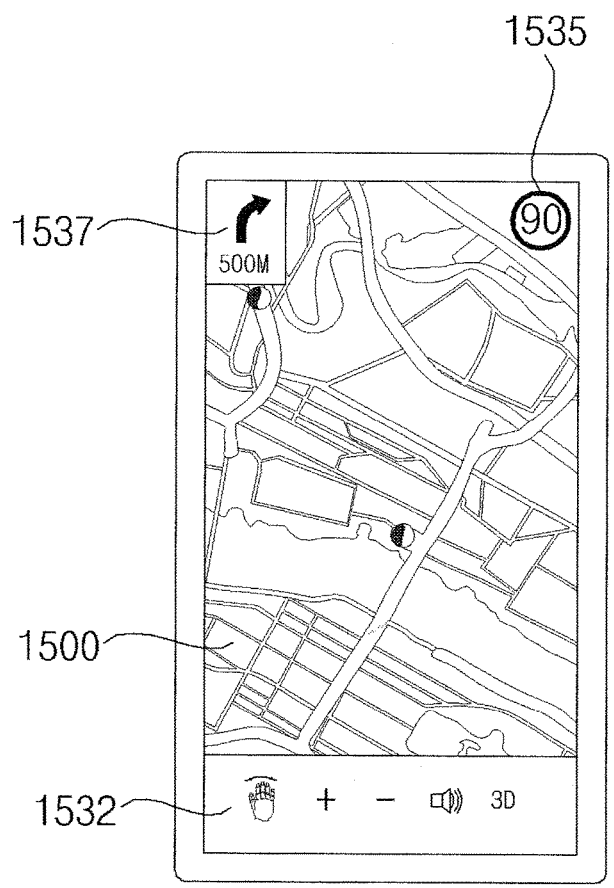

When user input is not received during a predetermined time in the zoom mode, that is, when the user's hand 400 does not move, as shown in FIG. 17, the zoom mode may be finished, the magnifier object 1540 may disappear, and only the map image 1500 may be displayed.

The vehicle display apparatus according to one embodiment of the present invention includes a display, a plurality of light emitting units provided in the periphery of the display, a plurality of light receiving units provided in the periphery of the display, and a processor configured to calculate a position of an approaching external object based on levels of light signals received by the plurality of light receiving units, the plurality of light emitting units sequentially emits light, the plurality of light receiving units sequentially receives light in correspondence with sequential light emission of the plurality of light emitting units, and the processor calculates the position of the external object based on the levels of the light signals received by the plurality of light receiving units in correspondence with sequential light emission of the plurality of light emitting units. Accordingly, it is possible to stably detect the position of the external object positioned in front of the display.

In particular, using the plurality of light emitting units and light receiving units, the position of the external object is calculated based on the output light and the received light, such that a blind spot does not occur upon recognizing a user's hand in front of the display apparatus. In addition, a user's hand detection speed is high and the present invention is applicable to a large display apparatus.

A space sensor and a touch sensor can operate according to the distance value of the user's hand. Therefore, it is possible to accurately obtain position information.

The vehicle display apparatus according to the foregoing embodiments is not restricted to the embodiments set forth herein. Therefore, variations and combinations of the exemplary embodiments set forth herein may fall within the scope of the present invention.

The method for operating the vehicle display apparatus according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, optical data storage, and a carrier wave (e.g., data transmission over the Internet). The computer-readable recording medium may be distributed over a plurality of computer systems connected to a network so that computer-readable code is written thereto and read therefrom in a decentralized manner. Functional programs, code, and code segments to realize the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vehicle display apparatus comprising:
   a display;
   a touch sensor provided on an upper surface or a lower surface of the display;
   a plurality of light emitting units provided at a periphery of the display and configured to sequentially emit light;
   a plurality of light receiving units provided at the periphery of the display and configured to sequentially receive light in correspondence with the plurality of light emitting units that sequentially emit light; and
   a processor configured to:
      calculate intensity levels of light signals received by the plurality of light receiving units; and
      calculate a position of an external object based on the intensity levels of light signals received by the plurality of light receiving units,
   wherein the processor is further configured to:
      calculate that a user's hand corresponds to the external object and is positioned between a first distance value and a second distance value from the display, the second distance value being smaller than the first distance value;
      based on the calculation that the user's hand corresponds to the external object and is positioned between the first distance value and the second distance value from the display, calculate a motion of the user's hand based on the light emitting units and the light receiving units;
      calculate that the user's hand is positioned between the second distance value and a third distance value from the display or is positioned within the third distance value from the display, the third distance value being smaller than the second distance value; and
      based on the calculation that the user's hand is positioned between the second distance value and the third distance value from the display or is positioned within the third distance value from the display:
         calculate a capacitance change sensed by the touch sensor; and
         calculate position information of the user's hand based on the calculated capacitance change sensed by the touch sensor.

2. The vehicle display apparatus according to claim 1, wherein the processor is configured to calculate the position of the external object based on the intensity levels of light signals received by the plurality of light receiving units by:
   calculating a plurality of center points between the plurality of light emitting units and the plurality of light receiving units, each of the plurality of center points corresponding to a position between one of the plurality of light emitting units and one of the plurality of light receiving units;
   calculating a light signal pattern of received light corresponding to each of the plurality of center points; and
   calculating the position of the external object based on the light signal pattern of received light corresponding to each of the plurality of center points and the intensity levels of the light signals received by the plurality of light receiving units.

3. The vehicle display apparatus according to claim 1, wherein the processor is configured to calculate the position of the external object based on the intensity levels of light signals received by the plurality of light receiving units by:
   calculating a plurality of center points between the plurality of light emitting units and the plurality of light receiving units, each of the plurality of center points corresponding to a position between one of the plurality of light emitting units and one of the plurality of light receiving units;
   selecting a center point among the plurality of center points based on the intensity levels of the light signals received by the plurality of light receiving units; and
   calculating the selected center point as the position of the external object.

4. The vehicle display apparatus according to claim 1, wherein the processor is further configured to, based on the intensity levels of the received light signals and based on the calculated position of the external object, calculate a distance value corresponding to the external object.

5. The vehicle display apparatus according to claim 1, wherein a number of the light emitting units provided at the periphery of the display is greater than a number of the light receiving units provided at the periphery of the display.

6. The vehicle display apparatus according to claim 1, wherein each of the plurality of light emitting units is spaced apart from neighboring light receiving units among the plurality of light receiving units along the periphery of the display.

7. The vehicle display apparatus according to claim 1, wherein the processor is further configured to:
- based on a calculation that the user's hand is positioned between the second distance value and the third distance value from the display, set a size of a touch sensing cell to a first size; and
- based on a calculation that the user's hand is positioned within the third distance value from the display, set the size of the touch sensing cell to a second size, which is smaller than the first size.

8. The vehicle display apparatus according to claim 1, wherein the processor is further configured to:
- calculate that a user's hand corresponds to the external object;
- calculate that a motion trajectory of the user's hand corresponds to a circular trajectory; and
- based on the calculation that the motion trajectory of the user's hand corresponds to the circular trajectory, control an initiation of a zoom mode for zooming-in or zooming-out of at least a part of an image displayed on the display.

9. The vehicle display apparatus according to claim 8, wherein the processor is configured to:
- calculate whether the user's hand approaches the display or moves away from the display after the initiation of the zoom mode;
- based on a calculation that the user's hand approaches the display, control a zooming-in of the at least a part of the image displayed on the display after the initiation of the zoom mode; and
- based on a calculation that the user's hand moves away from the display, control a zooming-out of the at least a part of the image displayed on the display after the initiation of the zoom mode.

10. The vehicle display apparatus according to claim 9, wherein the processor is further configured to:
- calculate that the vehicle display apparatus is in a state of displaying a map image on the display;
- calculate that input corresponding to the circular trajectory is received in the state of displaying the map image on the display; and
- control display of a magnifier object for zooming-in or zooming-out of the map image on the display based on the calculation that the input corresponding to the circular trajectory is received in the state of displaying the map image on the display.

11. The vehicle display apparatus according to claim 8, wherein the processor is configured to:
- calculate that the vehicle display apparatus is in a state of displaying a map image on the display;
- calculate that input corresponding to the circular trajectory is received in the state of displaying the map image on the display; and
- control the initiation of the zoom mode for zooming-in or zooming-out of the map image based on the calculation that the input corresponding to the circular trajectory is received in the state of displaying the map image on the display.

12. The vehicle display apparatus according to claim 8, wherein the processor is further configured to:
- calculate that the vehicle display apparatus is in a state of displaying a map image on the display;
- calculate that input corresponding to the circular trajectory is received in the state of displaying the map image on the display; and
- control a display of a magnifier object for zooming-in or zooming-out of the map image on the display based on the calculation that the input corresponding to the circular trajectory is received in the state of displaying the map image on the display.

13. The vehicle display apparatus according to claim 12, wherein the circular trajectory is in a first direction and the processor is further configured to:
- calculate that the vehicle display apparatus is in a state of displaying the magnifier object for zooming-in or zooming-out of the map image displayed on the display in the zoom mode;
- calculate that the motion trajectory of the user's hand corresponds to a circular trajectory in a second direction different from the first direction in the state of displaying the magnifier object for zooming-in or zooming-out of the map image displayed on the display in the zoom mode; and
- control a termination of the magnifier object based on the calculation that the motion trajectory of the user's hand corresponds to the circular trajectory in the second direction different from the first direction in the state of displaying the magnifier object for zooming-in or zooming-out of the map image displayed on the display in the zoom mode.

14. The vehicle display apparatus according to claim 8, wherein the circular trajectory is in a first direction and the processor is further configured to:
- calculate, after the initiation of the zoom mode, that the motion trajectory of the user's hand corresponds to a circular trajectory in a second direction different from the first direction; and
- control a termination of the zoom mode based on a calculation that the motion trajectory of the user's hand corresponds to the circular trajectory in the second direction different from the first direction.

15. The vehicle display apparatus according to claim 8, wherein the processor is further configured to:
- calculate that input corresponding to the circular trajectory is received in a state of displaying a map image on the display;
- control initiation of the zoom mode for zooming-in or zooming-out of the map image based on a calculation that the input corresponding to the circular trajectory is received in the state of displaying the map image on the display;
- calculate that the input corresponding to the circular trajectory is received in a state of displaying a first menu screen on the display; and
- control a display of a second menu screen or a pre-set application execution screen based on the calculation that the input corresponding to the circular trajectory is received in the state of displaying the first menu screen on the display.

16. A method of controlling a vehicle display apparatus, the method comprising:
- sequentially emitting light through a plurality of light emitting units provided at a periphery of a display of the vehicle display apparatus;
- sequentially receiving light, through a plurality of light receiving units provided at the periphery of the display, in correspondence with the plurality of light emitting units that sequentially emit light; and
- calculating intensity levels of light signals received by the plurality of light receiving units;
- calculating a position of an external object based on the intensity levels of light signals received by the plurality of light receiving units, calculating that a user's hand corresponds to the external object and is positioned between a first distance value and a second distance value from the display, the second distance value being smaller than the first distance value;

based on the calculation that the user's hand corresponds to the external object and is positioned between the first distance value and the second distance value from the display, calculating a motion of the user's hand based on the light emitting units and the light receiving units;

calculating that the user's hand is positioned between the second distance value and a third distance value from the display or is positioned within the third distance value from the display, the third distance value being smaller than the second distance value; and based on the calculation that the user's hand is positioned between the second distance value and the third distance value from the display or is positioned within the third distance value from the display:

calculating a capacitance change sensed by a touch sensor provided on an upper surface or a lower surface of the display; and calculating position information of the user's hand based on the calculated capacitance change sensed by the touch sensor.

17. At least one non-transitory computer-readable recording medium encoded with at least one computer program comprising instructions that, when executed, operate to cause a vehicle display apparatus to perform operations comprising:

sequentially emitting light through a plurality of light emitting units provided at a periphery of a display of the vehicle display apparatus;

sequentially receiving light, through a plurality of light receiving units provided at the periphery of the display, in correspondence with the plurality of light emitting units that sequentially emit light; and calculating intensity levels of light signals received by the plurality of light receiving units;

calculating a position of an external object based on the intensity levels of light signals received by the plurality of light receiving units, calculating that a user's hand corresponds to the external object and is positioned between a first distance value and a second distance value from the display, the second distance value being smaller than the first distance value;

based on the calculation that the user's hand corresponds to the external object and is positioned between the first distance value and the second distance value from the display, calculating a motion of the user's hand based on the light emitting units and the light receiving units;

calculating that the user's hand is positioned between the second distance value and a third distance value from the display or is positioned within the third distance value from the display, the third distance value being smaller than the second distance value; and based on the calculation that the user's hand is positioned between the second distance value and the third distance value from the display or is positioned within the third distance value from the display:

calculating a capacitance change sensed by a touch sensor provided on an upper surface or a lower surface of the display; and calculating position information of the user's hand based on the calculated capacitance change sensed by the touch sensor.

\* \* \* \* \*